(12) United States Patent
Tsujimori et al.

(10) Patent No.: US 11,303,177 B2
(45) Date of Patent: Apr. 12, 2022

(54) STATOR FOR ROTATING ELECTRIC MACHINE AND METHOD OF MANUFACTURING THE STATOR

(71) Applicants: DENSO CORPORATION, Kariya (JP); TOYOTA JIDOSHA KABUSHIKI KAISHA, Toyota (JP)

(72) Inventors: Yoki Tsujimori, Kariya (JP); Tsuyoshi Koda, Kariya (JP); Akiyoshi Kutsuna, Kariya (JP); Yoshitomo Kawanishi, Nagakute (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 398 days.

(21) Appl. No.: 16/034,706

(22) Filed: Jul. 13, 2018

(65) Prior Publication Data
US 2019/0020239 A1   Jan. 17, 2019

(30) Foreign Application Priority Data
Jul. 13, 2017 (JP) .............................. JP2017-137026

(51) Int. Cl.
*H02K 3/04* (2006.01)
*H02K 3/34* (2006.01)
(Continued)

(52) U.S. Cl.
CPC .............. *H02K 3/345* (2013.01); *H02K 1/16* (2013.01); *H02K 3/12* (2013.01); *H02K 15/024* (2013.01);
(Continued)

(58) Field of Classification Search
CPC ............ H02K 3/345; H02K 3/34; H02K 1/16; H02K 3/12; H02K 3/30; H02K 3/48;
(Continued)

(56) References Cited

U.S. PATENT DOCUMENTS

| | | | | |
|---|---|---|---|---|
| 2,701,316 A | * | 2/1955 | Willits | H02K 3/345 310/214 |
| 6,335,583 B1 | * | 1/2002 | Kusase | H02K 1/165 310/201 |
| 6,346,758 B1 | * | 2/2002 | Nakamura | H02K 1/165 310/215 |
| 2003/0205945 A1 | * | 11/2003 | Ioi | H02K 1/165 310/216.043 |

(Continued)

FOREIGN PATENT DOCUMENTS

| | | |
|---|---|---|
| CN | 103370857 A | 10/2013 |
| JP | 55-141947 | * 11/1980 |

(Continued)

*Primary Examiner* — Thanh Lam
(74) *Attorney, Agent, or Firm* — Oliff PLC

(57) ABSTRACT

A stator includes an annular stator core having slots formed therein, a stator coil received in the slots, and insulating sheets each being interposed, in a corresponding one of the slots, between the stator coil and an interior wall surface of the stator core defining the corresponding slot. Each of the insulating sheets includes a sheet-like substrate and a resin layer provided on an outer surface of the substrate. The resin layer is formed of a curable and foamable resin that is foamed and cured by external stimulation. Each of the insulating sheets has an extension portion located outside the corresponding slot and extending nonparallel to an axial direction of the stator core so as to face an axial end face of the stator core. In each of the insulating sheets, the resin layer is provided, on the outer surface of the substrate, in a region including the extension portion.

10 Claims, 13 Drawing Sheets

(51) Int. Cl.
  *H02K 1/16* (2006.01)
  *H02K 15/10* (2006.01)
  *H02K 15/02* (2006.01)
  *H02K 15/085* (2006.01)
  *H02K 3/12* (2006.01)
  *H02K 15/12* (2006.01)

(52) U.S. Cl.
  CPC ......... *H02K 15/085* (2013.01); *H02K 15/105* (2013.01); *H02K 15/12* (2013.01); *H02K 2213/03* (2013.01)

(58) Field of Classification Search
  CPC .......... H02K 15/10; H02K 15/12; H02K 3/38; H02K 15/024; H02K 15/026; H02K 15/085; H02K 15/105; H02K 2213/03; H02K 1/165; Y10T 29/49009; Y10T 29/49012; Y10T 29/49073; Y10T 29/49071
  USPC ........ 310/214–215, 201, 208, 179–180, 194; 29/596, 598, 605, 606
  See application file for complete search history.

(56) References Cited

U.S. PATENT DOCUMENTS

| | | | | |
|---|---|---|---|---|
| 2009/0096313 | A1* | 4/2009 | Harada | H02K 3/522 310/201 |
| 2009/0289520 | A1* | 11/2009 | Takeshita | H02K 3/487 310/214 |
| 2010/0244615 | A1* | 9/2010 | Kouda | H02K 3/345 310/215 |
| 2013/0309481 | A1* | 11/2013 | Kasagi | H01B 3/301 428/304.4 |
| 2015/0188379 | A1* | 7/2015 | Jung | H02K 3/34 310/215 |

FOREIGN PATENT DOCUMENTS

| | | | |
|---|---|---|---|
| JP | 58-39233 | * | 3/1983 |
| JP | S5839233 A | | 3/1983 |
| JP | 2011-244596 A | | 12/2011 |
| JP | 2014-100039 A | | 5/2014 |
| JP | 2017-077095 A | | 4/2017 |
| JP | 2017077095 | * | 4/2017 |
| JP | 2018-098948 A | | 6/2018 |

* cited by examiner

STATOR FOR ROTATING ELECTRIC MACHINE AND METHOD OF MANUFACTURING THE STATOR

CROSS-REFERENCE TO RELATED APPLICATION

This application is based on and claims priority from Japanese Patent Application No. 2017-137026 filed on Jul. 13, 2017, the contents of which are hereby incorporated by reference in its entirety into this application.

BACKGROUND

1 Technical Field

The present invention relates to stators for rotating electric machines that are used in, for example, motor vehicles as electric motors and electric generators, and to methods of manufacturing the stators.

2 Description of Related Art

A stator for a rotating electric machine generally includes a stator core having slots formed therein and a stator coil mounted on the stator core so as to be received in the slots of the stator core. Moreover, there is known a stator configuration where insulating sheets are provided respectively in the slots of the stator core so as to surround the stator coil, thereby electrically insulating the stator coil from the stator core and fixedly holding the stator coil in the slots. Furthermore, there is also known a configuration of the insulating sheets where each of the insulating sheets is formed by laminating two resin layers respectively on two surfaces of a sheet-like substrate; the resin layers being formed of a foamable thermosetting resin.

For example, according to the disclosure of Japanese Patent Application Publication No. JP2011244596A, the insulating sheets are provided respectively in the slots of the stator core so as to be sandwiched between interior wall surfaces of the stator core defining the slots and the stator coil received in the slots. Then, the insulating sheets are heated and thereby expanded to fix the stator coil to the stator core. In addition, each of the insulating sheets is formed by laminating a film (e.g., polyethylene-naphthalate (PEN) film) and resin layers formed of a thermosetting resin (e.g., epoxy resin) including a plurality of spherical foaming agents therein.

In such a stator as described above, the insulating sheets, which are inserted in the slots of the stator core, may be displaced in an axial direction of the stator core, lowering the insulating performance thereof. For example, in manufacturing the stator, when the insulating sheets are first inserted in the slots of the stator core and then the stator coil (more specifically, electrical conductor segments forming the stator coil) is inserted inside the insulating sheets, the insulating sheets may be axially displaced by the frictional force between the insulating sheets and the stator coil.

In addition, in terms of improving the space factors of the stator coil in the slots of the stator core, it is preferable to minimize void spaces in the slots. However, in this case, it is easier for the insulating sheets to be axially displaced by the frictional force between the insulating sheets and the stator coil during the insertion of the stator coil inside the insulating sheets.

SUMMARY

According to one exemplary embodiment, there is provided a stator for a rotating electric machine. The stator includes: an annular stator core having a plurality of slots arranged in a circumferential direction thereof; a stator coil provided on the stator core so as to be received in the slots of the stator core; and a plurality of insulating sheets each of which is interposed, in a corresponding one of the slots of the stator core, between the stator coil and an interior wall surface of the stator core defining the corresponding slot. Each of the insulating sheets includes a sheet-like substrate and a resin layer provided on an outer surface of the substrate facing the interior wall surface of the stator core defining the corresponding slot. The resin layer is formed of a curable and foamable resin that is foamed and cured by external stimulation. Each of the insulating sheets has an extension portion located outside the corresponding slot of the stator core. The extension portion extends nonparallel to an axial direction of the stator core so as to face an axial end face of the stator core. In each of the insulating sheets, the resin layer is provided, on the outer surface of the substrate, in a region including the extension portion.

In the above stator, each of the insulating sheets is interposed, in the corresponding slot of the stator core, between the stator coil and the interior wall surface of the stator core defining the corresponding slot. Therefore, if the insulating sheets are displaced in the axial direction of the stator core, the performance of the insulating sheets electrically insulating between the stator core and the stator coil may be lowered.

However, with the above configuration of the stator according to the exemplary embodiment, each of the insulating sheets has the extension portion that is located outside the corresponding slot of the stator core and extends nonparallel to the axial direction of the stator core so as to face the axial end face of the stator core. Consequently, with the extension portion, displacement of the insulating sheet in the axial direction of the stator core is suppressed.

In particular, with the above configuration, in each of the insulating sheets, on the outer surface of the substrate which faces the interior wall surface of the stator core defining the corresponding slot, there is provided the resin layer in a region including the extension portion of the insulating sheet. With the resin layer interposed between the extension portion and the axial end face of the stator core, the relative position of the extension portion to the axial end face of the stator core is maintained. Consequently, displacement of the insulating sheet in the axial direction of the stator core is more reliably suppressed. As a result, it is possible to retain the insulating sheet in the corresponding slot of the stator core in a suitable state.

For example, in manufacturing the stator, when electrical conductor segments forming the stator coil are inserted inside the insulating sheets that have already been inserted in the corresponding slots of the stator core, the insulating sheets may be axially displaced, by the frictional force between the insulating sheets and the electrical conductor segments, in the insertion direction of the electrical conductor segments. However, with the configuration of the stator according to the exemplary embodiment, it is possible to suppress displacement of the insulating sheets in the axial direction of the stator core during the insertion of the electrical conductor segments inside the insulating sheets.

Moreover, with the resin layers provided on the outer surfaces of the substrates of the insulating sheets in the region including the extension portions, it is possible to prevent the substrates of the insulating sheets from being damaged by corner edges of the corresponding slots at that axial end of the stator core from which the extension portions protrude outside the corresponding slots. Consequently, it is possible to omit a process of chamfering the corner edges, thereby simplifying the manufacture of the stator.

In a further implementation, the axial end face of the stator core which the extension portion of each of the insulating sheets faces is a first axial end face. In each of the insulating sheets, the extension portion is provided at a first axial end of the insulating sheet and a protruding portion is provided at a second axial end of the insulating sheet which is on the opposite axial side to the first axial end. The protruding portion protrudes outside the corresponding slot of the stator core from a second axial end face of the stator core which is on the opposite axial side to the first axial end face of the stator core. The region, in which the resin layer is provided on the outer surface of the substrate of the insulating sheet, also includes the protruding portion.

Consequently, it is possible to form a resin-expanded portion on the second axial end face of the stator core by causing the resin layer provided in the protruding portion to expand. As a result, with the anchor effect of the resin-expanded portion, it is possible to more reliably suppress the insulating sheet from being axially displaced.

In a yet further implementation, the stator coil is formed of a plurality of electrical conductor segments each of which is substantially U-shaped to have a pair of straight portions and a turn portion connecting the straight portions. The straight portions are inserted respectively in corresponding two of the slots of the stator core from a first axial side of the stator core to have end parts thereof protruding respectively from the corresponding two slots to a second axial side of the stator core which is opposite to the first axial side. The protruding end parts of the straight portions are twisted respectively toward opposite sides in the circumferential direction of the stator core. Each corresponding pair of the protruding end parts of the straight portions of the electrical conductor segments are connected to each other. The extension portions of the insulating sheets are provided on the first axial side of the stator core.

With the above configuration, during the twisting of the electrical conductor segments, on the first axial side of the stator core from which the electrical conductor segments are inserted inside the insulating sheets, corner edges of the corresponding slots may bite into the substrates of the insulating sheets and into the electrical conductor segments. However, with the resin layers provided on the outer surfaces of the substrates of the insulating sheets on the first axial side of the stator core, it is possible to suppress the corner edges of the corresponding slots from biting into the substrates of the insulating sheets and into the electrical conductor segments. As a result, it is possible to suppress the insulation properties of the stator from being lowered.

In a still further implementation, in each of the insulating sheets, the resin layer provided on the outer surface of the substrate is an outer resin layer. Each of the insulating sheets further includes an inner resin layer that is provided, on an inner surface of the substrate facing the stator coil, in a region excluding at least the extension portion of the insulating sheet. The inner resin layer is also formed of a curable and foamable resin that is foamed and cured by external stimulation.

With the above configuration, in each of the insulating sheets, the extension portion has no inner resin layer formed on the inner surface thereof. Therefore, in forming the extension portion by pressing a jig on the inner surface of the substrate, the inner resin layer is prevented from being foamed and cured by the external stimulation from the jig. Consequently, the inner resin layer is prevented from impeding the insertion of the electrical conductor segments inside the insulating sheet.

In a yet still further implementation, in each of the insulating sheets, the substrate has a bend formed to conform to a corner on the interior wall surface of the stator core defining the corresponding slot. Each of the insulating sheets has first and second thickness-adjusted portions provided respectively in first and second regions on the outer surface of the substrate. The first region extends along the bend of the substrate. The second region intersects the first region and adjoins the extension portion of the insulating sheet. In the first and second thickness-adjusted portions, the thickness of the resin layer is set to zero or to be smaller than in other portions on the outer surface of the substrate.

With the first thickness-adjusted portion provided in the first region, it is possible to reliably suppress occurrence of cracking or peeling of the resin layer at the bend. Moreover, the first thickness-adjusted portion forms, in the corresponding slot 21 of the stator core 20, an air gap that extends in the axial direction of the stator core. Consequently, with the axially-extending air, the stator coil can be cooled over the entire axial length of the stator core. On the other hand, the second thickness-adjusted portion provided in the second region forms a ring-like air gap that surrounds the stator coil in the corresponding slot of the stator core. Consequently, with the ring-like air gap, the stator coil can be cooled over the entire circumference of a cross section of the corresponding slot taken perpendicular to the axial direction of the stator core.

According to the exemplary embodiment, there is also provided a method of manufacturing a stator for a rotating electric machine. The stator includes: an annular stator core having a plurality of slots arranged in a circumferential direction thereof; a stator coil provided on the stator core so as to be received in the slots of the stator core; and a plurality of insulating sheets each of which is interposed, in a corresponding one of the slots of the stator core, between the stator coil and an interior wall surface of the stator core defining the corresponding slot. Each of the insulating sheets includes a sheet-like substrate and a resin layer that is provided, on an outer surface of the substrate facing the interior wall surface of the stator core defining the corresponding slot, in a region including an axial end portion of the insulating sheet. The resin layer is formed of a curable and foamable resin that is foamed and cured by external stimulation. In each of the insulating sheets, the substrate has a width in an axial direction of the stator core larger than an axial length of the stator core. The method includes: a sheet insertion step for inserting each of the insulating sheets, along the interior wall surface of the stator core defining the corresponding slot, into the corresponding slot so that the axial end portion of the insulating sheet is located axially outside an axial end face of the stator core; an extension portion forming step for forming, for each of the insulating sheets, an extension portion of the insulating sheet by pressing the axial end portion of the insulating sheet toward the axial end face of the stator core using a jig, the extension portion extending nonparallel to the axial direction of the stator core so as to face the axial end face of the stator core; and a coil insertion step for inserting, from an axial side of the stator core where the extension portion of each of the insulating sheets is formed, the stator coil inside the insulating sheets in the corresponding slots of the stator core.

In the extension portion forming step of the above method, for each of the insulating sheets, the axial end portion of the insulating sheet is pressed by the jig toward the axial end face of the stator core, forming the extension portion of the insulating sheet. Moreover, each of the insulating sheets has the resin layer provided on the outer surface of the substrate in the region including the axial end portion of the insulating sheet. Therefore, in the extension portion forming step, the curable and foamable resin forming the resin layer in the axial end portion of the insulating sheet is foamed and cured by external stimulation from the jig. Hence, in the subsequent coil insertion step, even if frictional force is generated between the insulating sheets and the stator coil, with the foamed and cured resin layers interposed between the extension portions of the insulating sheets and the axial end face of the stator core, the relative position of the extension portions to the axial end face of the stator core is maintained. Consequently, displacement of the insulating sheets in the axial direction of the stator core is reliably suppressed. As a result, it is possible to retain the insulating sheets in the corresponding slots of the stator core in a suitable state.

Moreover, with the resin layers provided on the outer surfaces of the substrates of the insulating sheets in the region including the axial end portions (i.e., the extension portions) of the insulating sheets, it is possible to prevent the substrates of the insulating sheets from being damaged by corner edges of the corresponding slots at that axial end of the stator core from which the extension portions protrude outside the corresponding slots. Consequently, it is possible to omit a step of chamfering the corner edges, thereby simplifying the method of manufacturing the stator.

In a further implementation, in each of the insulating sheets, the region, in which the resin layer is provided on the outer surface of the substrate, includes an in-slot portion of the insulating sheet which is received in the corresponding slot of the stator core as well as the axial end portion of the insulating sheet which constitutes the extension portion. The method further includes, after the coil insertion step, a resin curing step for applying the external stimulation to the stator core and thereby causing, for each of the insulating sheets, the resin layer provided in the in-slot portion of the insulating sheet to be foamed and cured.

Consequently, for each of the insulating sheets, the in-slot portion of the insulating sheet is placed in a state of being adhered to the interior wall surface of the stator core defining the corresponding slot via the resin layer. As a result, displacement of the insulating sheet in the axial direction of the stator core is more reliably suppressed.

Moreover, in the above method, the foaming and curing of the resin layers of the insulating sheets are performed in two stages. In the first stage, the external stimulation is applied to the extension portions of the insulating sheets before the coil insertion step. In the second stage, the external stimulation is applied to the entire insulating sheets except for or including the extension portions after the coil insertion step. Consequently, it is possible to suitably foam and cure the resin layers of the insulating sheets taking into account the force axially applied to the insulating sheets in the coil insertion step.

In a yet further implementation, in each of the insulating sheets, the resin layer provided on the outer surface of the substrate is an outer resin layer. Each of the insulating sheets further includes an inner resin layer that is provided, on an inner surface of the substrate facing the stator coil, in a region including the in-slot portion of the insulating sheet. The inner resin layer is also formed of a curable and foamable resin that is foamed and cured by external stimulation. In the resin curing step, the external stimulation is applied to both the stator core and the stator coil at the same time, causing the outer and inner resin layers provided in the in-slot portions of the insulating sheets to be foamed and cured at the same time.

Consequently, it is possible to homogenize the outer and inner resin layers and reduce the time required for curing the outer and inner resin layers. Moreover, with the outer and inner resin layers, it is possible to suppress both axial displacement of the insulating sheets with respect to the stator core and axial displacement of the stator coil with respect to the insulating sheets.

In a still further implementation, in each of the insulating sheets, the resin layer provided on the outer surface of the substrate is an outer resin layer. Each of the insulating sheets further includes an inner resin layer that is provided, on an inner surface of the substrate facing the stator coil, in a region excluding at least the axial end portion of the insulating sheet which constitutes the extension portion. In the extension portion forming step, for each of the insulating sheets, the extension portion of the insulating sheet is formed with the jig set in contact with only part of the inner surface of the insulating sheet where no inner resin layer is provided.

Consequently, in the extension portion forming step, the inner resin layers of the insulating sheets are prevented from being foamed and cured by external stimulation from the jig. As a result, in the subsequent coil insertion step, the inner resin layers of the insulating sheets are prevented from impeding the insertion of the stator coil inside the insulating sheets.

In a yet still further implementation, in the sheet insertion step, for each of the insulating sheets, the substrate of the insulating sheet is bent to have a bend conforming to a corner on the interior wall surface of the stator core defining the corresponding slot. Each of the insulating sheets has a thickness-adjusted portion provided in a region extending along the bend of the substrate. In the thickness-adjusted portion, thicknesses of the outer and inner resin layers are set to zero or to be smaller than in other portions on the outer and inner surfaces of the substrate of the insulating sheet.

Consequently, with the thickness-adjusted portion provided in the region extending along the bend of the substrate, it is possible to reliably suppress occurrence of cracking or peeling of the resin layers at the bend. Moreover, it is also possible to suppress the inner resin layer from unintentionally making contact with the jig in the extension portion forming step.

BRIEF DESCRIPTION OF THE DRAWINGS

The present invention will be understood more fully from the detailed description given hereinafter and from the accompanying drawings of one exemplary embodiment, which, however, should not be taken to limit the present invention to the specific embodiment but are for the purpose of explanation and understanding only.

In the accompanying drawings.

DESCRIPTION OF EMBODIMENT

Figure 1:
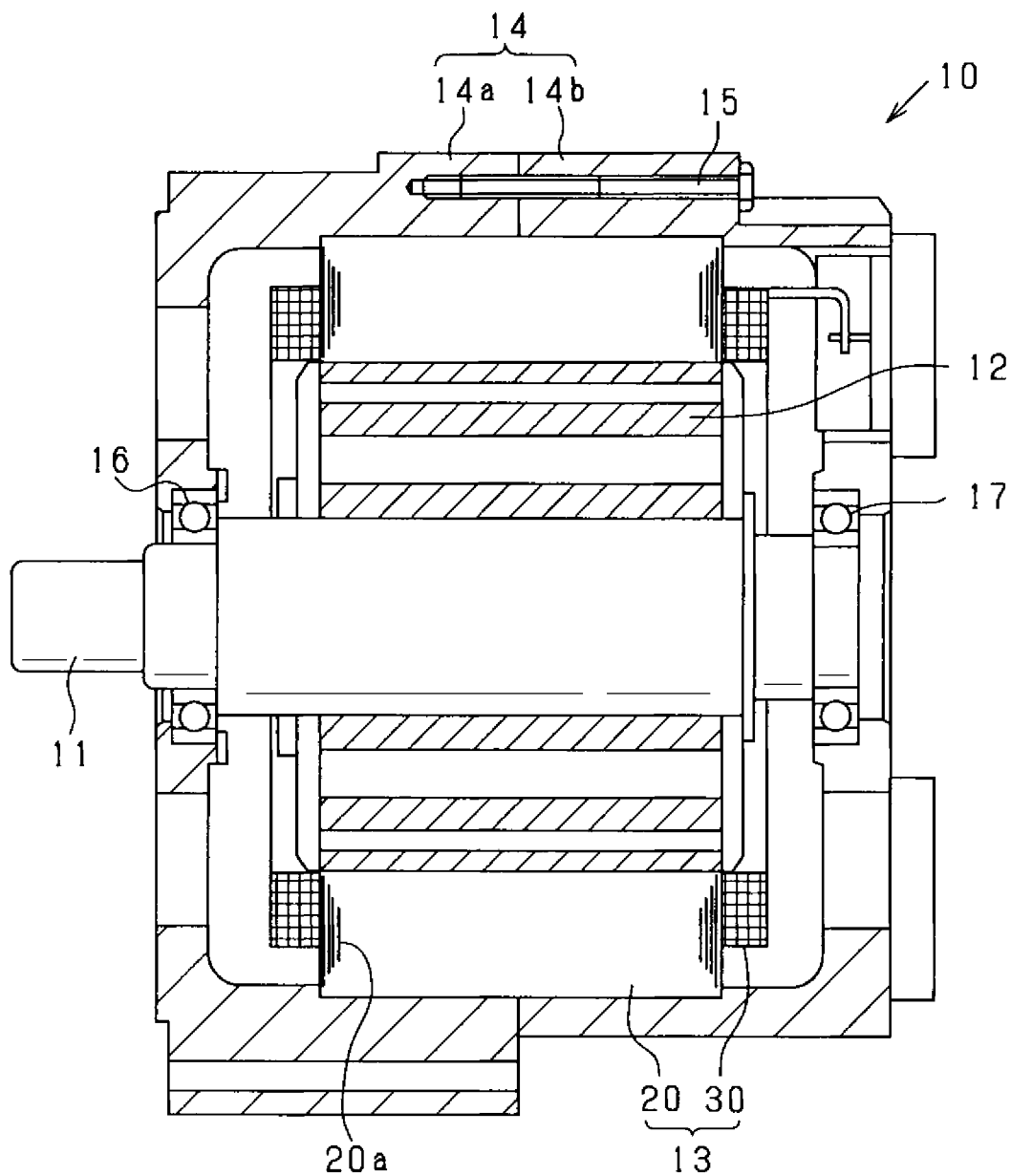
FIG. 1 is a partially cross-sectional view of a rotating electric machine which includes a stator according to the exemplary embodiment.

FIG. 1 shows the overall configuration of a rotating electric machine 10 which includes a stator 13 according to an exemplary embodiment.

In the present embodiment, the rotating electric machine 10 is configured as an automotive alternator for use in, for example, a passenger car or a truck.

As shown in FIG. 1, the rotating electric machine 10 includes a rotating shaft 11, a rotor 12 fixed on the rotating shaft 11, the stator 13 provided at such a position as to surround the rotor 12, and a housing 14 that receives both the rotor 12 and the stator 13.

The housing 14 has a substantially hollow cylindrical shape with both axial ends thereof closed. The housing 14 is comprised of a pair of cup-shaped housing pieces 14a and 14b. The housing pieces 14a and 14b are fastened, for example by bolts 15, into one piece with open ends thereof opposed to each other. The housing 14 has a pair of bearings 16 and 17 provided respectively in opposite axial end walls thereof.

The rotating shaft 11 is rotatably supported by the housing 14 via the pair of bearings 16 and 17.

The rotor 12 is fixedly fitted on an axially central part of the rotating shaft 11 so as to rotate together with the rotating shaft 11. The rotor 12 has a plurality of permanent magnets embedded therein. The permanent magnets form a plurality of magnetic poles on a radially outer periphery of the rotor 12 facing a radially inner periphery of the stator 13. The magnetic poles are spaced at predetermined intervals in a circumferential direction of the rotor 12 so that the polarities of the magnetic poles alternate between north and south in the circumferential direction. The number of the magnetic poles can be suitably set according to the design specification of the rotating electric machine 10. In the present embodiment, the number of the magnetic poles is set to, for example, eight (i.e., four north poles and four south poles).

The stator 13 includes an annular (or hollow cylindrical) stator core 20 disposed radially outside the rotor 12 and a three-phase stator coil 30 mounted on the stator core 20.

Figure 2:
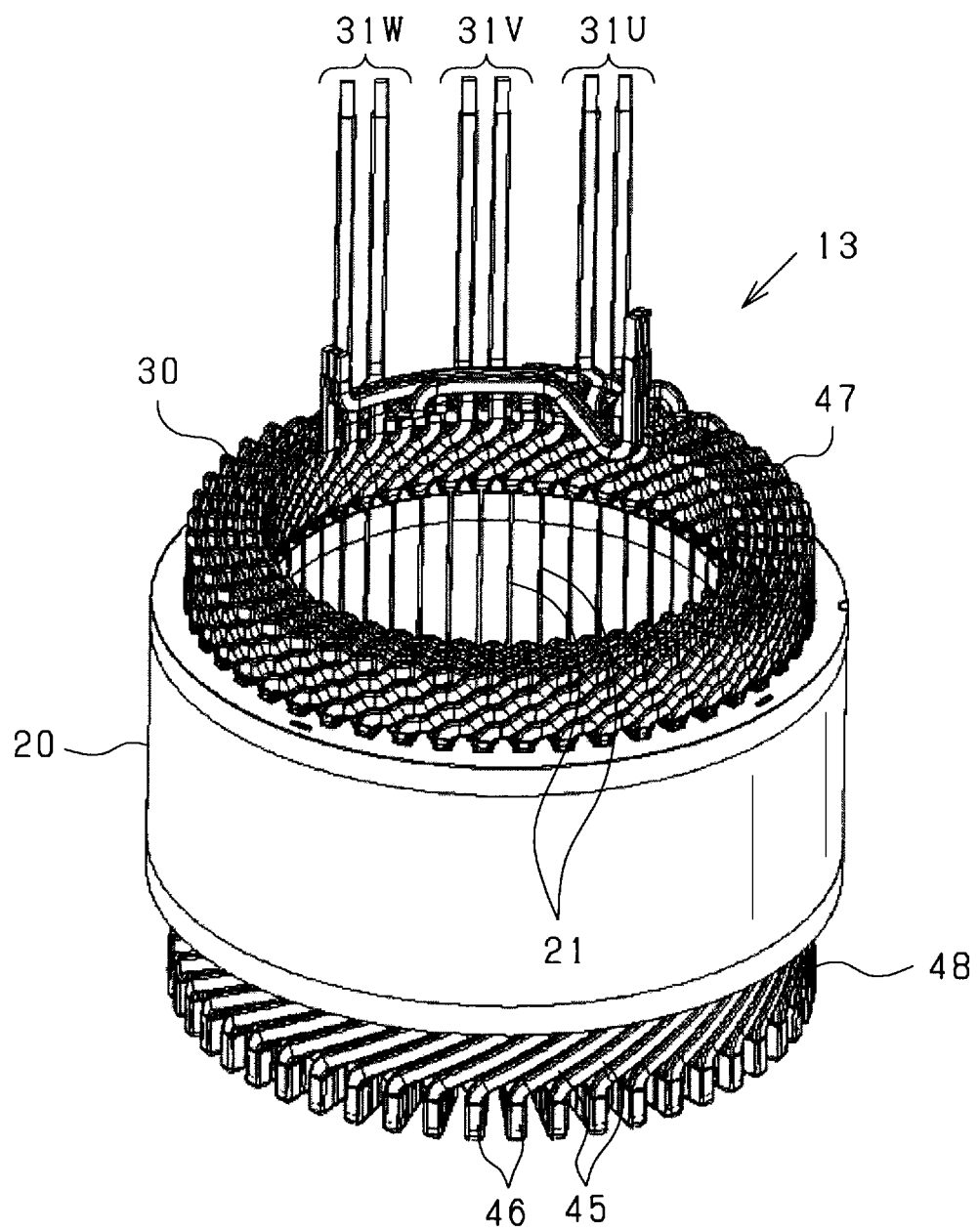
FIG. 2 is a perspective view of the stator.

Referring now to FIG. 2, the stator core 20 has a plurality of slots 21 arranged in a circumferential direction thereof. The stator coil 30 is comprised of a U-phase winding 31U, a V-phase winding 31V and a W-phase winding 31W that are distributedly wound in the slots 21 of the stator core 20.

In the present embodiment, the stator core 20 is formed by laminating a plurality of annular magnetic steel sheets 20a (see FIG. 1) in the axial direction of the stator core 20 and fixing them together by, for example, staking. It should be appreciated that other conventional metal sheets may also be used instead of the magnetic steel sheets.

Figure 3:
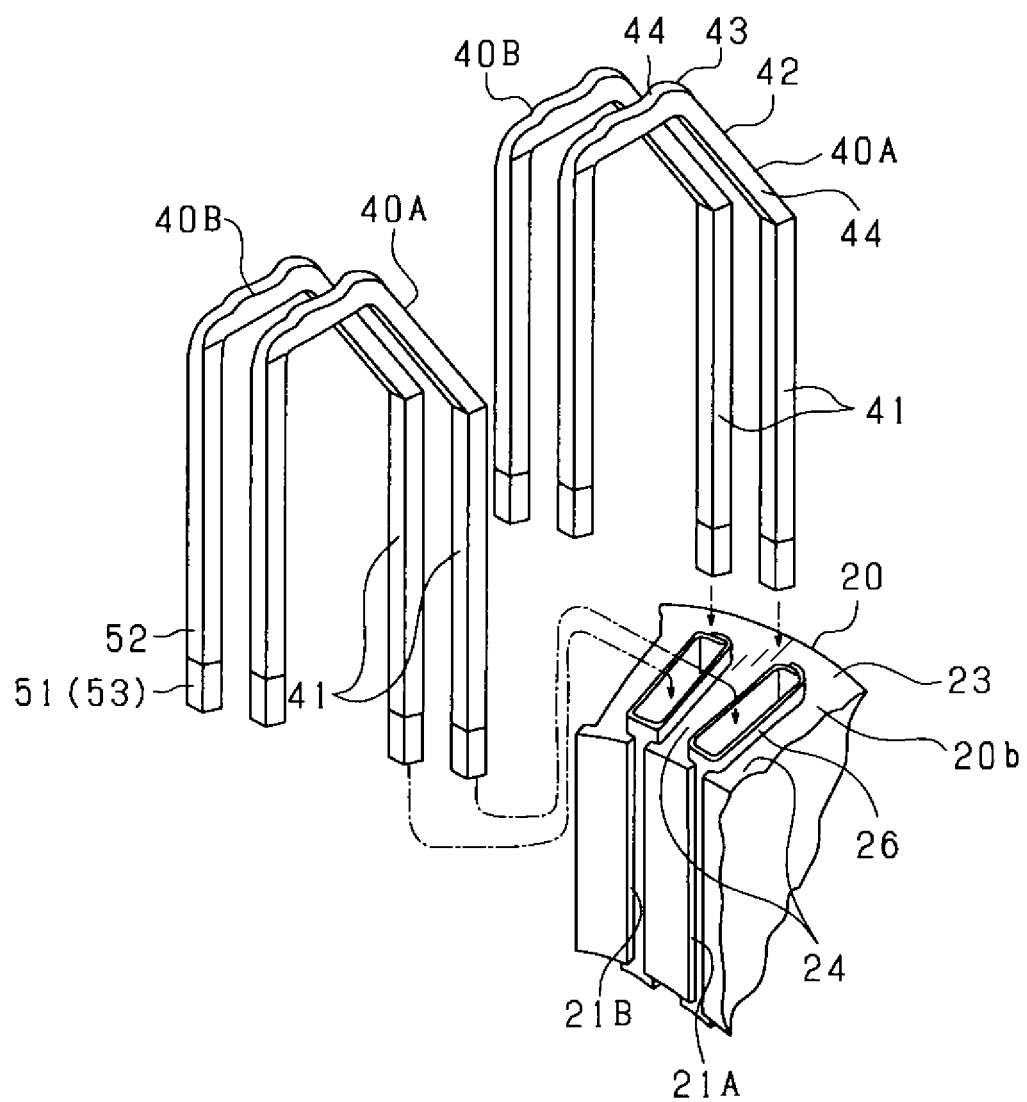
FIG. 3 is a schematic view illustrating the manner of inserting electrical conductor segments forming a stator coil into slots of a stator core of the stator.

Moreover, as shown in FIG. 3, the stator core 20 includes an annular back core 23 and a plurality of teeth 24 in addition to the aforementioned slots 21. The teeth 24 each protrude radially inward from the back core 23 and are circumferentially spaced at a predetermined pitch. Each of the slots 21 is formed between one circumferentially-adjacent pair of the teeth 24. Accordingly, the slots 21 are circumferentially arranged at the same predetermined pitch as the teeth 24. In addition, each of the slots 21 extends in the axial direction of the stator core 20 to axially penetrate the stator core 20.

In the present embodiment, each of the teeth 24 has a pair of collar portions (or flanges) 25 formed at its distal end (or radially inner end) to extend respectively toward opposite circumferential sides. The collar portions 25 correspond to circumferentially-extending inner wall portions.

Moreover, in the present embodiment, the number of the slots 21 per magnetic pole of the rotor 12 and per phase of the stator coil 30 is equal to 2. In other words, the slot multiplier number is equal to 2. Accordingly, the total number of the slots 21 formed in the stator core 20 is equal to 48 (i.e., 2×8×3). In addition, the forty-eight slots 21 are comprised of pairs of U-phase slots 21A and 21B, V-phase slots 21A and 21B and W-phase slots 21A and 21B which are sequentially and repeatedly arranged in the circumferential direction of the stator core 20.

In the present embodiment, for each of the slots 21, the depth direction of the slot 21 coincides with a radial direction of the stator core 20. Moreover, each of the slots 21 is configured as a partially-closed slot which is partially closed at a radially inner end thereof by one circumferentially-facing pair of the collar portions 25 of the teeth 24. In other words, each of the slots 21 partially opens on the radially inner surface of the stator core 20. In addition, each of the slots 21 is narrowed (i.e., reduced in circumferential width) in the vicinity of the radially inner end thereof by the circumferentially-facing pair of the collar portions 25 of the teeth 24.

It should be noted that each of the slots 21 may alternatively be configured as a closed slot which is completely closed at the radially inner end thereof by a circumferentially-extending inner wall portion of the stator core 20.

In the present embodiment, the stator coil 30 is formed by first mounting a plurality of substantially U-shaped electrical conductor segments 40 as shown in FIG. 3 to the stator core 20 and then joining each corresponding pair of distal ends of the electrical conductor segments 40 by welding.

As shown in FIG. 3, each of the electrical conductor segments 40 is substantially U-shaped to have a pair of straight portions 41 extending parallel to each other and a turn portion 42 connecting ends of the straight portions 41 on the same side. The straight portions 41 have a length greater than the axial length of the stator core 20. The turn portion 42 has an apex part 43 formed at the center of the turn portion 42 so as to extend parallel to a corresponding one of axial end faces 20b of the stator core 20. The turn portion 42 also has a pair of oblique parts 44 formed respectively on opposite sides of the apex part 43 so as to extend obliquely at a predetermined angle with respect to the corresponding axial end face 20b of the stator core 20.

In the present embodiment, the electrical conductor segments 40 are obtained by cutting and plastically deforming an electric wire that includes an electrical conductor 51 and an insulating coat 52. The electrical conductor 51 is formed of an electrically conductive material (e.g., copper) and has a substantially rectangular cross section. The insulating coat 52 is formed of an electrically insulative resin and provided to cover the outer surface of the electrical conductor 51.

In addition, as shown in FIG. 3, the insulating coat 52 is removed from distal end parts of the straight portions 41 of the electrical conductor segments 40 (i.e., end parts of the straight portions 41 on the opposite side to the turn portions 42). Consequently, the distal end parts of the straight portions 41 of the electrical conductor segments 40 constitute exposed parts 53 of the straight portions 41 which are exposed from the insulating coat 52.

In the present embodiment, the width of each of the straight portions 41 of the electrical conductor segments 40 in a direction, which coincides with the circumferential direction of the stator core 20 upon insertion of the straight portions 41 of the electrical conductor segments 40 into the corresponding slots 21 of the stator core 20, is set to be smaller than the circumferential width of each of the slots 21 of the stator core 20.

As mentioned previously, in the present embodiment, the slots 21 of the stator core 20 are comprised of a plurality of slot pairs each consisting of a first slot 21A and a second slot 21B; the first and second slots 21A and 21B are circumferentially adjacent to each other and belong to the same phase (i.e., the same one of the U, V, and W phases). On the other hand, the electrical conductor segments 40 forming the stator coil 30 are comprised of a plurality of electrical conductor segment pairs each consisting of a first electrical conductor segment 40A and a second electrical conductor segment 40B; the first and second electrical conductor segments 40A and 40B have the same shape and size.

For each electrical conductor segment pair, the straight portions 41 of the first electrical conductor segment 40A are inserted, from a first axial side (i.e., the upper side in FIG. 3) of the stator core 20, respectively into the first slot 21A of a first slot pair and the first slot 21A of a second slot pair; the straight portions 41 of the second electrical conductor segment 40B are inserted, from the first axial side of the stator core 20, respectively into the second slot 21B of the first slot pair and the second slot 21B of the second slot pair. That is, the first and second electrical conductor segments 40A and 40B are circumferentially offset from each other by one slot pitch. In addition, the first slot pair and the second slot pair are located away from each other by one magnetic pole pitch (or six slot-pitches).

For example, in the case of the electrical conductor segment pair which is shown on the upper right side in FIG. 3, the first electrical conductor segment 40A has its right straight portion 41 inserted in the eighth layer (i.e., the radially outermost layer) of the first slot 21A shown in FIG. 3 and its left straight portion 41 inserted in the seventh layer of the first slot 21A (not shown) that is located away from the first slot 21A shown in FIG. 3 counterclockwise by one magnetic pole pitch. On the other hand, the second electrical conductor segment 40B has its right straight portion 41 inserted in the eighth layer of the second slot 21B shown in FIG. 3 and its left straight portion 41 inserted in the seventh layer of the second slot 21B (not shown) that is located away from the second slot 21B shown in FIG. 3 counterclockwise by one magnetic pole pitch.

Figure 4:
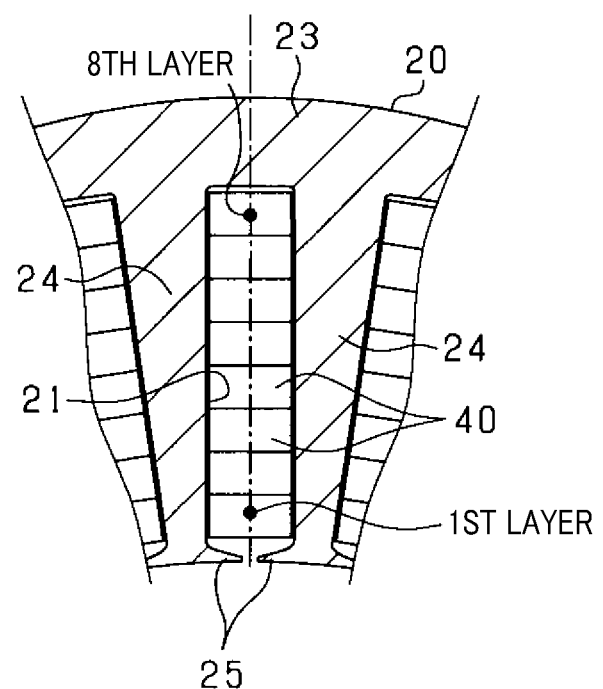
FIG. 4 is a cross-sectional view of part of the stator.

In the above manner, in each of the slots 21 of the stator core 20, there are inserted an even number of the straight portions 41 of the electrical conductor segments 40. More particularly, in the present embodiment, as shown in FIG. 4, in each of the slots 21 of the stator core 20, there are inserted eight straight portions 41 of the electrical conductor segments 40 so as to be radially stacked in eight layers in the slot 21.

Moreover, in the present embodiment, as shown in FIG. 3, in each of the slots 21 of the stator core 20, there is provided one insulating sheet 26 to electrically insulate between the stator core 20 and the stator coil 30 (i.e., the electrical conductor segments 40). The insulating sheet 26 is bent according to the shape and size of the plurality (e.g., eight in the present embodiment) of electrical conductor segments 40 inserted in the slot 21 and arranged to surround all of the plurality of electrical conductor segments 40 together. Consequently, the insulating sheet 26 is placed in a state of being sandwiched between an interior wall surface of the stator core 20 defining the slot 21 and the electrical conductor segments 40 inserted in the slot 21. In addition, the insulating sheet 26 protrudes outside the slot 21 from both the axial end faces 20b of the stator core 20.

After the insertion of the straight portions 41 of the electrical conductor segments 40 into the corresponding slots 21 of the stator core 20, for each of the electrical conductor segments 40, protruding parts of the straight portions 41 of the electrical conductor segment 40, which protrude outside the corresponding slots 21 on a second axial side (i.e., the lower side in FIG. 3) of the stator core 20, are twisted respectively toward opposite sides in the circumferential direction of the stator core 20 so as to extend obliquely at a predetermined angle with respect to the corresponding axial end face 20b of the stator core 20. Consequently, each of the protruding parts of the straight portions 41 is transformed into an oblique part 45 of the electrical conductor segment 40; the oblique part 45 extends in the circumferential direction of the stator core 20 for substantially half a magnetic pole pitch (see FIG. 2).

Then, on the second axial side of the stator core 20, each corresponding pair of the oblique parts 45 of the electrical conductor segments 40 are joined (e.g., by welding) at their respective distal ends, forming a joint (or weld) 46 therebetween (see FIG. 2). Consequently, all the electrical conductor segments 40 are electrically connected in a predetermined pattern, thereby forming the stator coil 30.

More particularly, in the present embodiment, for each of the electrical conductor segments 40, the straight portions 41 of the electrical conductor segment 40 are inserted in the corresponding slots 21 of the stator core 20 so as to be respectively located at the mth and (m+1)th layers, where m is a natural number greater than or equal to 1 and less than or equal to 7. Consequently, the straight portions 41 of the electrical conductor segment 40 respectively make up two in-slot portions of the electrical conductor segment 40 which are respectively received at the mth and (m+1)th layers in the corresponding slots 21 of the stator core 20. Moreover, the oblique parts 45 of the electrical conductor segment 40 are also respectively located at the mth and (m+1)th layers. Furthermore, for each corresponding pair of the oblique parts 45 of the electrical conductor segments 40, the two oblique parts 45 of the pair are respectively located at the mth and (m+1)th layers and joined to each other.

In the present embodiment, each of the U-phase, V-phase and W-phase windings 31U, 31V and 31W of the stator coil 30 is formed by electrically connecting a predetermined number of the electrical conductor segments 40 in series with one another. Consequently, each of the U-phase, V-phase and W-phase windings 31U, 31V and 31W of the stator coil 30 is wave-wound around the stator core 20 by, for example, eight turns (or eight circle rounds) in the circumferential direction of the stator core 20. Moreover, the U-phase, V-phase and W-phase windings 31U, 31V and 31W of the stator coil 30 are star-connected with each other.

Referring back to FIG. 2, the stator coil 30 mounted on the stator core 20 has an annular first coil end part 47 on the first axial side (i.e., the upper side in FIG. 2) of the stator core 20 and an annular second coil end part 48 on the second axial side (i.e., the lower side in FIG. 2) of the stator core 20. The first coil end part 47 is constituted of the turn portions 42 of the electrical conductor segments 40 which protrude from the corresponding (i.e., the first) axial end face 20b of the stator core 20. The second coil end part 48 is constituted of the oblique parts 45 of the electrical conductor segments 40, which protrude from the corresponding (i.e., the second) axial end face 20b of the stator core 20, and the joints 46 formed between the oblique parts 45.

In addition, at the first coil end part 47, the electrical connection between the in-slot portions of the electrical conductor segments 40 is made by the turn portions 42 at a six-slot pitch. On the other hand, at the second coil end part 48, the electrical connection between the in-slot portions of the electrical conductor segments 40 is made by the oblique parts 45 and the joints 46 at a six-slot pitch.

Next, the configuration of the insulating sheets 26, which are provided between the stator core 20 and the electrical conductor segments 40 forming the stator coil 30, will be described in detail with reference to FIGS. 5-7.

Figure 5:
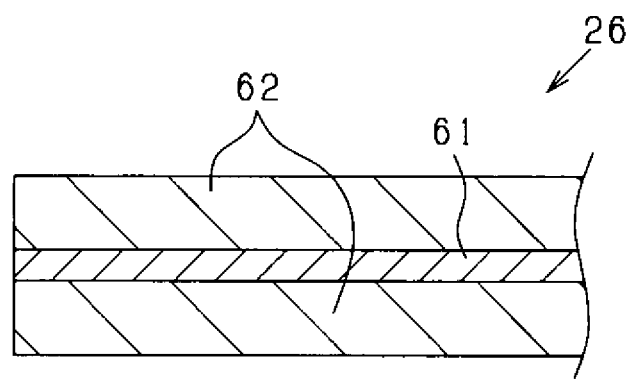
FIG. 5 is a cross-sectional view illustrating the configuration of insulating sheets of the stator.

As shown in FIG. 5, in the present embodiment, each of the insulating sheets 26 includes a sheet-like substrate 61 and a pair of resin layers 62 provided respectively on two surfaces of the substrate 61. The substrate 61 is formed of a resin, such as a PPS (polyphenylene sulfide) or a PEN (polyethylene naphthalate) resin, to have a predetermined strength. The resin layers 62 are formed of a curable and foamable resin that is foamed and cured by external stimulation. More specifically, the curable and foamable resin is obtained by dispersing beads, which are foamable by thermal stimulation, in a thermosetting resin such as an epoxy resin. The resin layers 62 are formed by applying the curable and foamable resin to the surfaces of the substrate 61. The resin layers 62 have a predetermined thickness in the range of, for example, several tens of micrometers to one millimeter. Of the pair of resin layers 62, that resin layer 62 which is provided on the outer surface of the substrate 61 is bonded to the interior wall surface of the stator core 20 defining the slot 21 while the other resin layer 62 which is provided on the inner surface of the substrate 61 is bonded to the stator coil 30. Therefore, the resin layers 62 can be regarded as adhesive layers.

In addition, the substrate 61 may alternatively be formed of a nonwoven fabric. The resin layers 62 may include, as the foaming agent, an acrylic resin or a urethane resin instead of the beads. Moreover, the resin layers 62 may be formed of, instead of the thermosetting resin, a UV-curable resin which is cured by irradiation of UV (ultraviolet) rays or an anaerobically curable resin that cures in the absence of air.

Figure 6:
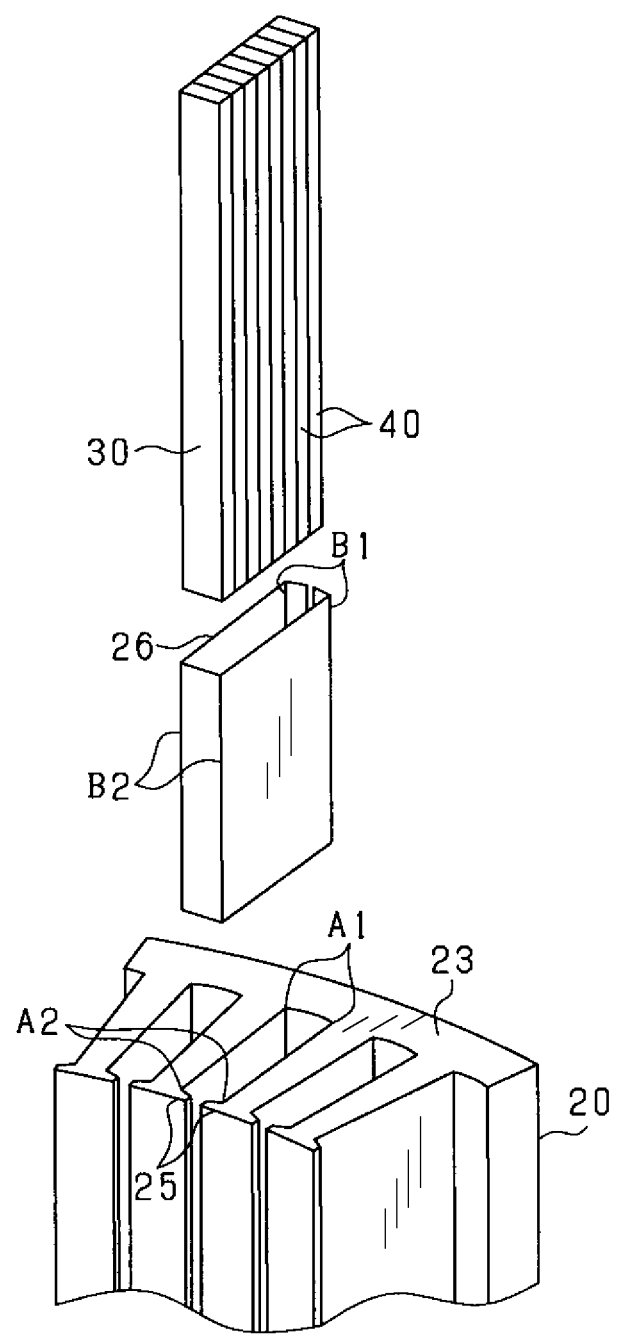
FIG. 6 is an exploded perspective view of the stator core, one of the insulating sheets which is to be inserted in one of the slots of the stator core, and the electrical conductor segments to be inserted inside the insulating sheet.

In manufacturing the stator 13, the insulating sheets 26 and the electrical conductor segments 40 (i.e., the stator coil 30) are assembled to the stator core 20 in a state as shown in FIG. 6. Specifically, as described previously, the electrical conductor segments 40 forming the stator coil 30 are assembled to the stator core 20 so that in each of the slots 21 of the stator core 20, there are inserted eight straight portions 41 of the electrical conductor segments 40 so as to be radially stacked in eight layers in the slot 21. Moreover, each of the insulating sheets 26 is bent at four positions (or bent into the shape of a rectangular tube) and inserted in a corresponding one of the slots 21 of the stator core 20 to surround all of the eight straight portions 41 of the electrical conductor segments 40 received in the corresponding slot 21. More specifically, each of the slots 21 of the stator core 20 has two first corners A1 on the radially outer side and two second corners A2 on the radially inner side. Each of the first corners A1 is formed between the back core 23 and one of the two teeth 24 defining the slot 21. Each of the second corners A2 is formed between one of the two teeth 24 defining the slot 21 and the collar portion 25 extending circumferentially from the one of the two teeth 24. Accordingly, each of the insulating sheets 26 has two first bends B1 formed respectively at two positions corresponding to the first corners A1 of the corresponding slot 21 and two second bends B2 formed respectively at two positions corresponding to the second corners A2 of the corresponding slot 21.

In addition, after being inserted in the corresponding slots 21, the insulating sheets 26 are in a state of being bent at substantially 90 degrees at the first and second bends B1 and B2. However, before being inserted in the corresponding slots 21, the insulating sheets 26 are in a state of being plastically deformed at an obtuse angle (i.e., an angle larger than 90 degrees). It should be noted that before being inserted in the corresponding slots 21, the insulating sheets 26 may alternatively be in a state of being plastically deformed at substantially 90 degrees.

In the present embodiment, as shown in FIG. 6, each of the insulating sheets 26 is provided so that end portions of the insulating sheet 26 overlap each other on the radially outer side. It should be noted that each of the insulating sheets 26 may alternatively be provided so that end portions of the insulating sheet 26 overlap each other on the radially inner side.

Moreover, in the present embodiment, the insulating sheets 26 are first assembled to the stator core 20 and then the electrical conductor segments 40 forming the stator coil 30 are assembled to the stator core 20. Thereafter, thermal stimulation is applied to the insulating sheets 26 inserted in the corresponding slots 21 of the stator core 20, causing the resin layers 62 of the insulating sheets 26 to be foamed and cured.

In addition, during the bending of the insulating sheets 26 before the assembly thereof to the stator core 20, the resin layers 62 of the insulating sheets 26 are in a semi-cured state (or so-called B-stage state) where the epoxy resin forming the resin layers 62 has not been completely cured. After the assembly of the insulating sheets 26 to the stator core 20, the resin layers 62 of the insulating sheets 26 are completely cured by heating and then cooling them.

In the stator 13, the insulating sheets 26, which are inserted in the corresponding slots 21 of the stator core 20, may be displaced in the axial direction of the stator core 20, lowering the performance thereof electrically insulating between the stator core 20 and the electrical conductor segments 40 (i.e., the stator coil 30). For example, in manufacturing the stator 13, when the electrical conductor segments 40 are inserted inside the insulating sheets 26 that have already been inserted in the corresponding slots 21 of the stator core 20, the insulating sheets 26 may be axially displaced, by the frictional force between the insulating sheets 26 and the electrical conductor segments 40, in the insertion direction of the electrical conductor segments 40.

Figure 7:
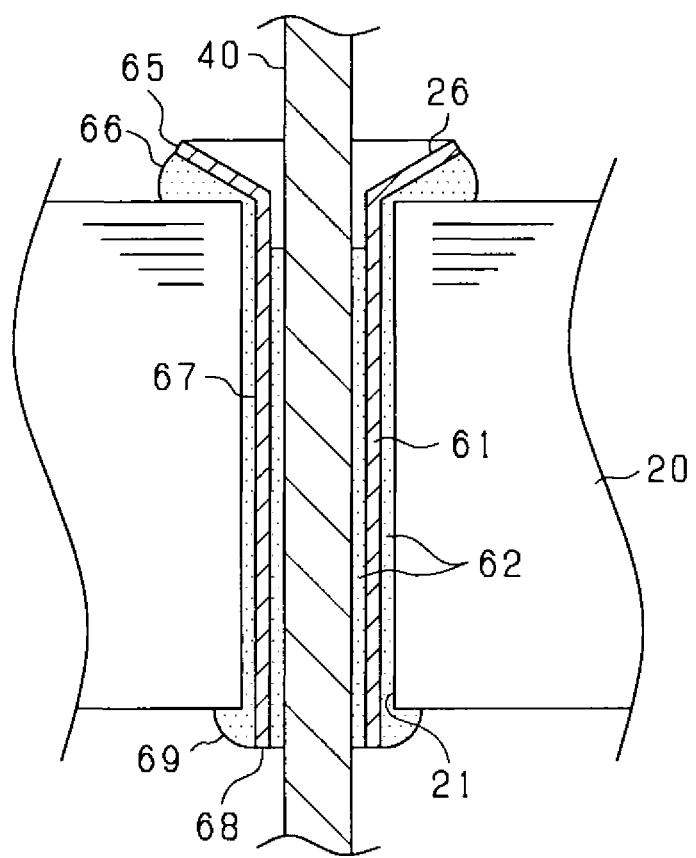
FIG. 7 is a cross-sectional view of part of the stator core, one of the insulating sheets which is inserted in one of the slots of the stator core, and part of one of the electrical conductor segments which is inserted inside the insulating sheet.

In view of the above, in the present embodiment, as shown in FIG. 7, each of the insulating sheets 26 is configured to have an extension portion 65 located outside the corresponding slot 21 of the stator core 20. The extension portion 65 extends, on the first axial side of the stator core 20 (or the axially outside of the first axial end face 20b of the stator core 20), nonparallel to an axial direction of the stator core 20 so as to face the first axial end face 20b of the stator core 20. Consequently, with the extension portion 65, the insulating sheet 26 is suppressed from being axially displaced. Moreover, on an outer surface of the insulating sheet 26 which faces the interior wall surface of the stator core 20 defining the corresponding slot 21, there is provided a resin-expanded portion 66. The resin-expanded portion 66 is formed by causing the resin layer 62 on the outer surface of the insulating sheet 26 to expand in a region including the extension portion 65. The resin-expanded portion 66 is provided to fill a space between the extension portion 65 of the insulating sheet 26 and the first axial end face 20b of the stator core 20, thereby maintaining the relative position of the extension portion 65 of the insulating sheet 26 to the first axial end face 20b of the stator core 20.

Furthermore, as shown in FIG. 7, each of the insulating sheets 26 is configured to include, in addition to the extension portion 65, an in-slot portion 67 and a protruding portion 68. The in-slot portion 67 is connected with the extension portion 65 and received in the corresponding slot 21 of the stator core 20. The protruding portion 68 is connected with the in-slot portion 67 and protrudes outside the corresponding slot 21 of the stator core 20 to the second axial side of the stator core 20 (i.e., to the opposite axial side to the extension portion 65). Moreover, for each of the insulating sheets 26, on the outer surface of the insulating sheet 26, there is also provided a resin-expanded portion 69. The resin-expanded portion 69 is formed by causing the resin layer 62 on the outer surface of the insulating sheet 26 to expand in a region including the protruding portion 68 of the insulating sheet 26. The resin-expanded portion 69 is provided to fill a space between the protruding portion 68 of the insulating sheet 26 and the second axial end face 20b of the stator core 20, thereby keeping the position of the protruding portion 68 of the insulating sheet 26 relative to the second axial end face 20b of the stator core 20.

Hereinafter, the configuration of the insulating sheets 26 according to the present embodiment will be described in more detail.

Figure 8A:
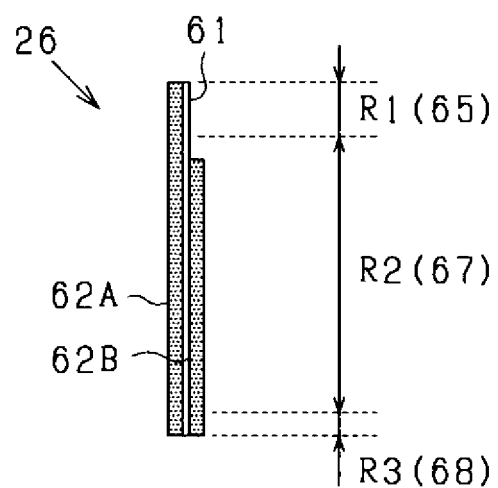
FIG. 8A is a cross-sectional view, along a thickness direction, of one of the insulating sheets before being bent.
Figure 8B:
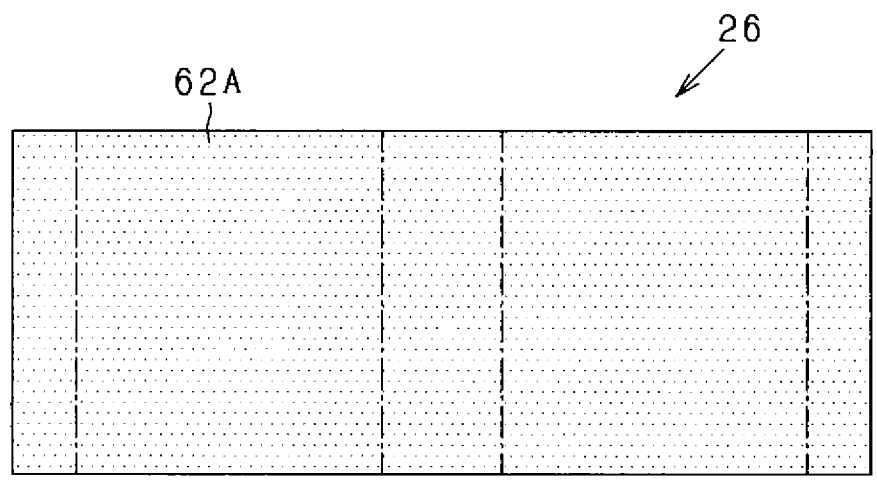
FIG. 8B is a plan view of an outer surface of the insulating sheet shown in FIG. 8A before being bent.
Figure 8C:
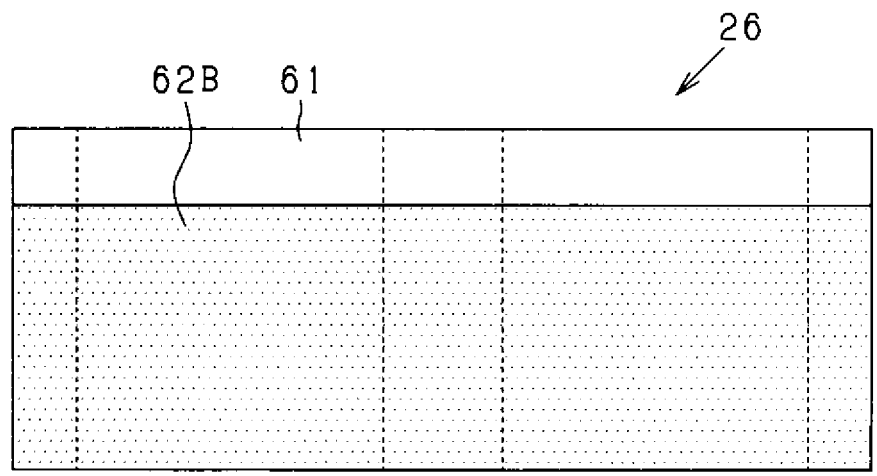
FIG. 8C is a plan view of an inner surface of the insulating sheet shown in FIGS. 8A-8B before being bent.

FIGS. 8A-8C show one of the insulating sheets 26 before being bent and assembled to the stator core 20. Specifically, FIG. 8A is a cross-sectional view of the insulating sheet 26 along its thickness direction. FIG. 8B is a plan view of the outer surface of the insulating sheet 26 (or that surface of the insulating sheet 26 which faces, after the insulating sheet 26 is bent and assembled to the stator core 20, the interior wall surface of the stator core 20 defining the corresponding slot 21). FIG. 8C is a plan view of the inner surface of the insulating sheet 26 (or that surface of the insulating sheet 26 which faces, after the insulating sheet 26 is bent and assembled to the stator core 20, the electrical conductor segments 40 inserted in the corresponding slot 21). Moreover, in FIGS. 8A-8C, the upper side corresponds to the first axial side of the stator core 20 where the first coil end part 47 of the stator coil 30 is located; the lower side corresponds to the second axial side of the stator core 20 where the second coil end part 48 of the stator coil 30 is located. In addition, in FIG. 8B, the ridge folds, where the insulating sheet 26 is bent to form ridges, are indicated with one-dot chain lines; in FIG. 8C, the valley folds, where the insulating sheet 26 is bent to form valleys, are indicated with dashed lines.

As described previously, each of the insulating sheets 26 has the pair of resin layers 62 formed respectively on the two surfaces of the substrate 61 to have the predetermined thickness. Hereinafter, for the sake of convenience of explanation, of the pair of resin layers 62, that resin layer 62 which is formed on the outer surface of the substrate 61 will be referred to as "outer resin layer 62A" whereas the other resin layer 62 which is formed on the inner surface of the substrate 61 will be referred to as "inner resin layer 62B".

In the present embodiment, the formation region of the outer resin layer 62A is different from the formation region of the inner resin layer 62B. Specifically, the outer resin layer 62A is formed over the entire outer surface of the substrate 61 whereas the inner resin layer 62B is formed on only part of the inner surface of the substrate 61.

More specifically, the substrate 61 has a width in the axial direction of the stator core 20 (i.e., the vertical direction in FIGS. 8A-8C) larger than the axial length of the stator core 20. In FIG. 8A, reference signs R1, R2 and R3 respectively designate portions of the insulating sheet 26 which respectively constitute the extension portion 65, the in-slot portion 67 and the protruding portion 68 after the insulating sheet 26 is bent and assembled to the stator core 20. As shown in FIGS. 8A-8C, the outer resin layer 62A is formed in all of the portions R1-R3 of the insulating sheet 26. In contrast, the inner resin layer 62B is formed in only the portion R3 and part of the portion R2. In other words, the portion R1 and part of the portion R2 have no inner resin layer 62B formed therein.

Next, a method, according to the present embodiment, of assembling the insulating sheets 26 and the electrical conductor segments 40 to the stator core 20 will be described with reference to FIGS. 9A-9D.

It should be noted that the assembly method is part of a method of manufacturing the stator 13 according to the present embodiment. The assembly method includes a sheet insertion step, an extension portion forming step, a coil insertion step, an electrical conductor joining step and a resin curing step.

Figure 9A:
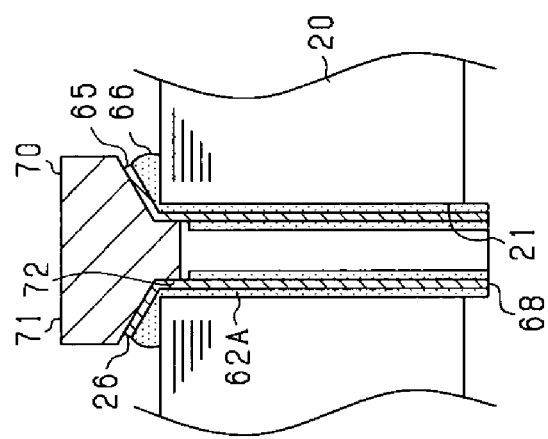
FIGS. 9A-9D are cross-sectional views respectively illustrating different steps of a method of manufacturing the stator.

First, in the sheet insertion step, as shown in FIG. 9A, each of the insulating sheets 26, which are bent in accordance with the cross-sectional shape of the slots 21 of the stator core 20, is inserted into the corresponding one of the slots 21.

More specifically, in this step, each of the insulating sheets 26 is inserted, along the interior wall surface of the stator core 20 defining the corresponding slot 21, into the corresponding slot 21 so that axial end portions of the insulating sheet 26 protrude outside the corresponding slot 21 respectively from the first and second axial end faces 20b of the stator core 20.

Figure 9B:
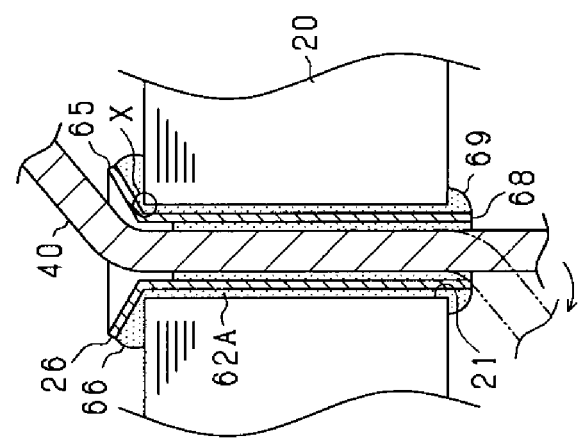

In the extension portion forming step, as shown in FIG. 9B, for each of the insulating sheets 26, that axial end portion of the insulating sheet 26 which protrudes from the first axial end face 20b of the stator core 20 is pressed by a jig 70 to form the extension portion 65 of the insulating sheet 26.

More specifically, the jig 70 includes a main body 71 having a tapered pressing surface and a tip 72 to be inserted inside the insulating sheet 26. In the extension portion forming step, the jig 70 is axially moved to have the tip 72 inserted inside the insulating sheet 26, causing the pressing surface of the main body 71 to press the axial end portion of the insulating sheet 26 from the inside thereof toward the first axial end face 20b of the stator core 20. Consequently, the axial end portion of the insulating sheet 26 is transformed into the extension portion 65.

Moreover, in this step, the jig 70 is heated to, for example, 80-100° C. Consequently, the outer resin layer 62A included in the extension portion 65 of the insulating sheet 26 is expanded, by thermal stimulation from the heated jig 70, to form the resin-expanded portion 66 of the insulating sheet 26.

In the present embodiment, the inner resin layer 62B is provided, on the inner surface of the insulating sheet 26, in a region excluding at least the extension portion 65 of the insulating sheet 26. More specifically, as shown in FIG. 9A, no inner resin layer 62B is provided on the inner surface of the insulating sheet 26 in a region from the upper end of the insulating sheet 26 to a position away from the first axial end face 20b of the stator core 20 inside the corresponding slot 21. In the extension portion forming step, the jig 70 is set in contact with only that part of the inner surface of the insulating sheet 26 where no inner resin layer 62B is provided.

In addition, if the extension portion 65 was formed with the jig 70 set to be in contact with the inner resin layer 62B provided on the inner surface of the insulating sheet 26, the inner resin layer 62B would be unintentionally foamed and cured by external stimulation (or thermal stimulation) from the jig 70. Consequently, in the subsequent coil insertion step, the inner resin layer 62B might impede the insertion of the electrical conductor segments 40 into the corresponding slot 21 of the stator core 20. In contrast, in the present embodiment, the extension portion 65 is formed with the jig 70 set to be out of contact with the inner resin layer 62B provided on the inner surface of the insulating sheet 26. Consequently, the inner resin layer 62B will not be foamed or cured in the extension portion forming step and thus will not impede the insertion of the electrical conductor segments 40 inside the insulating sheet 26 in the subsequent coil insertion step.

Figure 9C:
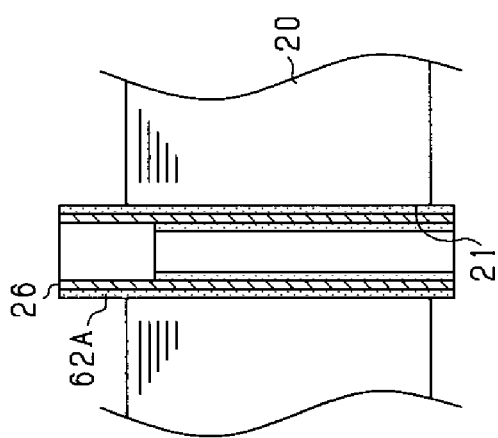

In the coil insertion step, as shown in FIG. 9C, for each of the insulating sheets 26 inserted in the corresponding slots 21 of the stator core 20, the electrical conductor segments 40 are inserted inside the insulating sheet 26 from the first axial side of the stator core 20 where the extension portion 65 of the insulating sheet 26 is formed.

In this step, the electrical conductor segments 40 are pressed into the insulating sheet 26 generating a frictional force against the insulating sheet 26. However, in the present embodiment, with the extension portion 65, the insulating sheet 26 is suppressed from being axially displaced and thus detached from the stator core 20.

Figure 9D:
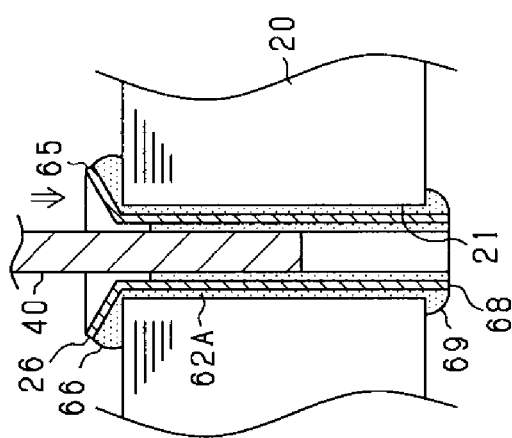

Next, referring to FIG. 9D, in the electrical conductor joining step, on the second axial side of the stator core 20 where no extension portions 65 of the insulating sheets 26 are formed, the electrical conductor segments 40 are twisted to form the oblique parts 45 thereof (see FIG. 2). Then, each corresponding pair of the oblique parts 45 of the electrical conductor segments 40 are joined (e.g., by welding) at their respective distal ends, forming the joint (or weld) 46 therebetween (see FIG. 2). Consequently, all the electrical conductor segments 40 are electrically connected to form the stator coil 30.

In addition, in this step, the electrical conductor segments 40 are drawn downward during the twisting thereof. Consequently, on the first axial side of the stator core 20 from which the electrical conductor segments 40 are inserted inside the insulating sheets 26, corner edges X of the corresponding slots 21 may bite into the substrates 61 of the insulating sheets 26 and into the electrical conductor segments 40. In this regard, in the present embodiment, the insulating sheets 26 have their respective outer resin layers 62A (or resin-expanded portions 66) provided on the outer surfaces thereof on the first axial side of the stator core 20. Consequently, it is possible to suppress the corner edges X of the corresponding slots 21 from biting into the substrates 61 of the insulating sheets 26 and into the electrical conductor segments 40. As a result, it is possible to suppress the insulation properties of the stator 13 from being lowered.

In the resin curing step, thermal stimulation is applied to the stator core 20 and the electrical conductor segments 40 at the same time, causing the resin layers 62A and 62B of the insulating sheets 26 to be foamed and cured in the corresponding slots 21 of the stator core 20.

In the present embodiment, the outer resin layers 62A and the inner resin layers 62B are foamed and cured at the same time respectively on the outer surfaces and the inner surfaces of the insulating sheets 26. Consequently, it is possible to homogenize the resin layers 62A and 62B and reduce the time required for curing the resin layers 62A and 62B.

Moreover, in the resin curing step, on the second axial side of the stator core 20, the outer resin layers 62A included in the protruding portions 68 of the insulating sheets 26 are expanded to form the resin-expanded portions 69 of the insulating sheets 26. Consequently, with the anchor effect of the resin-expanded portions 69, it is possible to more reliably suppress the insulating sheets 26 from being axially displaced and thus detached from the stator core 20.

As described above, in the present embodiment, the foaming and curing of the resin layers 62A and 62B of the insulating sheets 26 are performed in two stages. In the first stage, the thermal stimulation is applied to the extension portions 65 of the insulating sheets 26 before the insertion of the electrical conductor segments 40 into the corresponding slots 21 of the stator core 20. In the second stage, the thermal stimulation is applied to the entire insulating sheets 26 except for or including the extension portions 65 after the insertion of the electrical conductor segments 40 into the corresponding slots 21 of the stator core 20.

In addition, as described above, in the present embodiment, the resin curing step is performed after the electrical conductor joining step. However, it should be noted that the resin curing step may alternatively be performed before the electrical conductor joining step.

In manufacturing the stator 13 as shown in FIG. 6, cracking or peeling of the resin layers 62 may occur during the bending of the insulating sheets 26. Moreover, during the assembly of the insulating sheets 26 to the stator core 20, the bends B1 and B2 of the insulating sheets 26 may collide against the interior wall surfaces of the stator core 20 defining the corresponding slots 21, causing cracking of the outer resin layers 62A to occur at the bends B1 and B2.

Furthermore, during the insertion of the electrical conductor segments 40 inside the corresponding insulating sheets 26, corner portions of the electrical conductor segments 40 may collide with the bends B1 and B2 of the insulating sheets 26, causing cracking of the inner resin layers 62B to occur at the bends B1 and B2.

In view of the above, the resin layers 62 may be partially removed from the insulating sheets 26 at portions corresponding to the bends B1 and B2 thereof, thereby suppressing occurrence of cracking of the resin layers 62 in the insulating sheets 26.

Figure 10A:
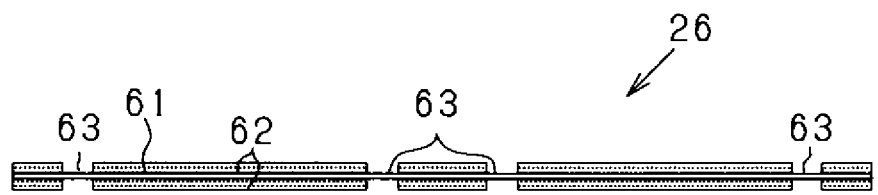
FIG. 10A is a cross-sectional view, along a thickness direction, of one of insulating sheets according to a modification before being bent.
Figure 10B:
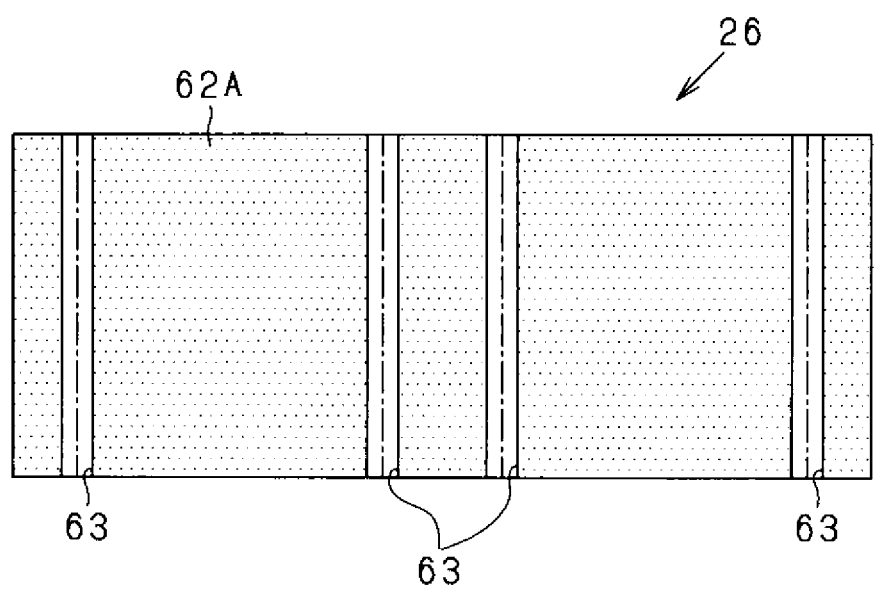
FIG. 10B is a plan view of an outer surface of the insulating sheet shown in FIG. 10A before being bent.
Figure 10C:
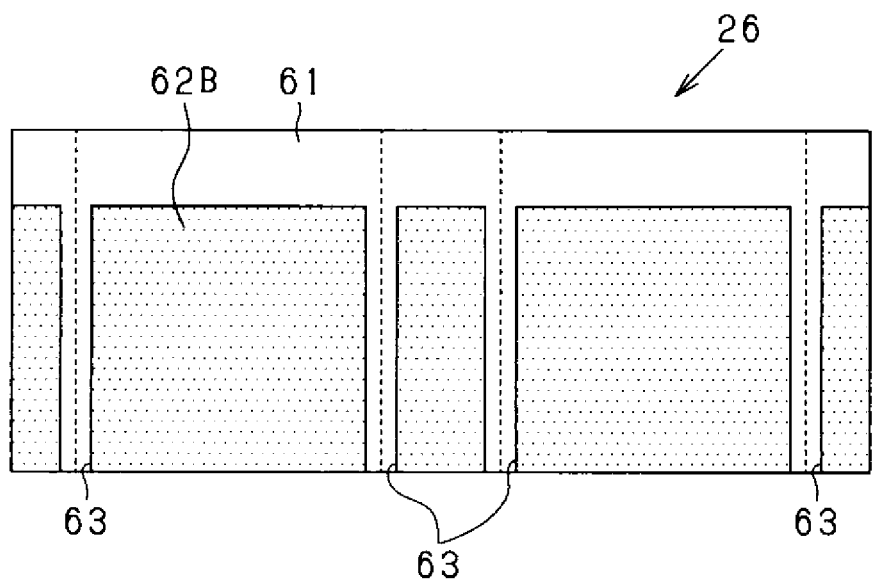
FIG. 10C is a plan view of an inner surface of the insulating sheet shown in FIGS. 10A-10B before being bent.

FIGS. 10A-10C show one of insulating sheets 26 according to a modification before being bent and assembled to the stator core 20. Specifically, FIG. 10A is a cross-sectional view of the insulating sheet 26 along its thickness direction. FIG. 10B is a plan view of an outer surface of the insulating sheet 26 (or that surface of the insulating sheet 26 which faces, after the insulating sheet 26 is bent and assembled to the stator core 20, the interior wall surface of the stator core 20 defining the corresponding slot 21). FIG. 10C is a plan view of an inner surface of the insulating sheet 26 (or that surface of the insulating sheet 26 which faces, after the insulating sheet 26 is bent and assembled to the stator core 20, the electrical conductor segments 40 inserted in the corresponding slot 21). Moreover, in FIGS. 10A-10C, the upper side corresponds to the first axial side of the stator core 20 where the first coil end part 47 of the stator coil 30 is located; the lower side corresponds to the second axial side of the stator core 20 where the second coil end part 48 of the stator coil 30 is located. In addition, in FIG. 10B, the ridge folds, where the insulating sheet 26 is bent to form ridges, are indicated with one-dot chain lines; in FIG. 10C, the valley folds, where the insulating sheet 26 is bent to form valleys, are indicated with dashed lines.

Figure 11:
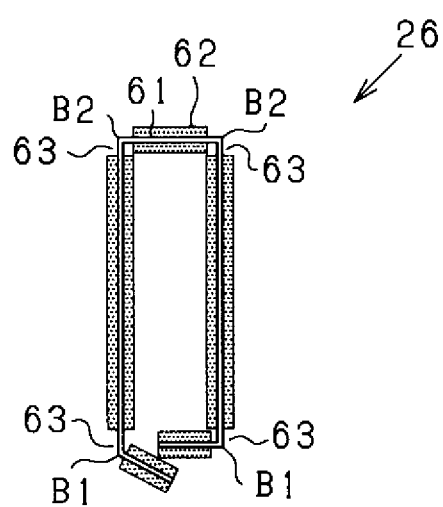
FIG. 11 is a cross-sectional view, along the thickness direction, of the insulating sheet shown in FIGS. 10A-10C after being bent.

On the other hand, FIG. 11 shows the insulating sheet 26 shown in FIGS. 10A-10C after being bent.

As shown in FIGS. 10A-10C and 11, in this modification, each of the insulating sheets 26 has thickness-adjusted portions 63 which respectively correspond to the bends B1 and B2 of the insulating sheet 26 and where the thicknesses of the outer and inner resin layers 62A and 62B are set to zero. In addition, the thickness-adjusted portions 63 may also be referred to as "thinned-out portions" in the sense of eliminating the outer and inner resin layers 62A and 62B therefrom.

Each of the thickness-adjusted portions 63 is formed in a predetermined region including a corresponding one of the bends B1 and B2 of the insulating sheet 26. The predetermined region may have a width of, for example, 0.5-20 mm. In other words, the predetermined region may extend from the centerline of the corresponding bend of the insulating sheet 26 by, for example, 0.3-10 mm in each side of the centerline. Moreover, for each of the thickness-adjusted portions 63, portions of the resin layers 62A and 62B on both sides of the thickness-adjusted portion 63, which will be arranged straight in the corresponding slot 21 of the stator core 20, may have a uniform thickness.

In addition, in FIGS. 10B and 10C, the left-right direction (or horizontal direction) corresponds to a winding direction in which the insulating sheet 26 is wound around the electrical conductor segments 40; the top-down direction (or vertical direction) corresponds to the axial direction of the stator core 20. Each of the thickness-adjusted portions 63 extends from one end to the other end of the insulating sheet 26 in the axial direction of the stator core 20. After the insulating sheet 26 is bent as shown in FIG. 11, end portions of the insulating sheet 26 in the winding direction overlap each other and the resin layers 62A and 6B provided respectively in the end portions are in contact with each other. On each side of the overlapping end portions of the insulating sheet 26 in the winding direction, there is provided one of the thickness-adjusted portions 63.

In manufacturing the insulating sheet 26 shown in FIGS. 10A-10C and 11, masking may be first performed on those portions of the surfaces of the substrate 61 which respectively correspond to the thickness-adjusted portions 63 and then the resin layers 62A and 62B may be respectively applied to the surfaces of the substrate 61. Alternatively, the resin layers 62A and 62B may be first respectively applied to the entire surfaces of the substrate 61 and then removed from those portions of the surfaces of the substrate 61 which respectively correspond to the thickness-adjusted portions 63.

In addition, in the case where the inner resin layer 62B is provided on the inner surface of the insulating sheet 26 except for the extension portion 65, during the bending of the insulating sheet 26 before the insertion thereof into the corresponding slot 21, at the internal corners (or on the interior angle side) of the insulating sheet 26, the inner resin layer 62B may expand toward the back side of the extension portion 65. In this case, in the extension portion forming step after the insertion of the insulating sheet 26 into the corresponding slot 21, the expanded portion of the inner resin layer 62B may make contact with the jig 70. In this regard, as shown in FIG. 10C, with the thickness-adjusted portions 63 provided in the predetermined regions along the bends B1 and B2 on the inner surface of the insulating sheet 26, it is possible to suppress the inner resin layer 62B from unintentionally making contact with the jig 70.

According to the present embodiment, it is possible to achieve the following advantageous effects.

In the stator 13, if the insulating sheets 26 were displaced in the axial direction of the stator core 20, the performance of the insulating sheets 13 electrically insulating between the stator core 20 and the stator coil 30 (i.e., the electrical conductor segments 40) would be lowered.

In particular, in the present embodiment, each of the insulating sheets 26 has the extension portion 65 that is located outside the corresponding slot 21 of the stator core 20 and extends nonparallel to the axial direction of the stator core 20 so as to face the first axial end face 20b of the stator core 20. Consequently, with the extension portion 65, displacement of the insulating sheet 26 in the axial direction of the stator core 20 is suppressed.

Moreover, in the present embodiment, in each of the insulating sheets 26, on the outer surface of the insulating sheet 26 which faces the interior wall surface of the stator core 20 defining the corresponding slot 21, there is provided the resin-expanded portion 66 (or the outer resin layer 62A) in a region including the extension portion 65 of the insulating sheet 26. With the resin-expanded portion 66 interposed between the extension portion 65 and the first axial end face 20b of the stator core 20, the relative position of the extension portion 65 to the first axial end face 20b of the stator core 20 is maintained. Consequently, displacement of the insulating sheet 26 in the axial direction of the stator core 20 is more reliably suppressed. As a result, it is possible to retain the insulating sheet 26 in the corresponding slot 21 of the stator core 20 in a suitable state.

For example, in manufacturing the stator 13, when the electrical conductor segments 40 are inserted inside the insulating sheets 26 that have already been inserted in the corresponding slots 21 of the stator core 20, the insulating sheets 26 may be axially displaced, by the frictional force between the insulating sheets 26 and the electrical conductor segments 40, in the insertion direction of the electrical conductor segments 40 (i.e., the downward direction in FIGS. 7 and 9A-9D). However, with the configuration of the stator 13 according to the present embodiment, it is possible to suppress displacement of the insulating sheets 26 in the axial direction of the stator core 20 during the insertion of the electrical conductor segments 40 inside the insulating sheets 26.

Moreover, with the outer resin layers 62A (or the resin-expanded portions 66) provided on the outer surfaces of the insulating sheets 26 in the region including the extension portions 65, it is possible to prevent the substrates 61 of the insulating sheets 26 from being damaged by the corner edges X of the corresponding slots 21 at that axial end of the stator core 20 from which the extension portions 65 protrude outside the corresponding slots 21 (i.e., the upper end in FIGS. 7 and 9A-9D). Consequently, it is possible to omit a process of chamfering the corner edges X, thereby simplifying the manufacture of the stator 13.

Furthermore, in the present embodiment, in each of the insulating sheets 26, the region, in which the outer resin layer 62A is provided on the outer surface of the insulating sheet 26, also includes the in-slot portion 67 of the insulating sheet 26 which is received in the corresponding slot 21 of the stator core 20. Consequently, the in-slot portion 67 is placed in a state of being adhered to the interior wall surface of the stator core 20 defining the corresponding slot 21 via the outer resin layer 62A. As a result, displacement of the insulating sheet 26 in the axial direction of the stator core 20 is more reliably suppressed.

In the present embodiment, in each of the insulating sheets 26, the extension portion 65 is provided at a first axial end of the insulating sheet 26 and the protruding portion 68 is provided at a second axial end of the insulating sheet 26 which is on the opposite axial side to the first axial end. The protruding portion 68 protrudes outside the corresponding slot 21 of the stator core 20 from the second axial end face 20b of the stator core 20. The region, in which the outer resin layer 62A is provided on the outer surface of the insulating sheet 26, also includes the protruding portion 68. Consequently, the resin-expanded portions 66 and 69 are formed by causing the outer resin layer 62A to expand respectively at the extension portion 65 and the protruding portion 68. As a result, with the anchor effect of the resin-expanded portions 66 and 69, displacement of the insulating sheet 26 in the axial direction of the stator core 20 is more reliably suppressed.

Moreover, with the outer resin layers 62A (or the resin-expanded portions 69) provided on the outer surfaces of the insulating sheets 26 in the region including the protruding portions 68, it is possible to prevent the substrates 61 of the insulating sheets 26 from being damaged by corner edges of the corresponding slots 21 at that axial end of the stator core 20 from which the protruding portions 68 protrude outside the corresponding slots 21 (i.e., the lower end in FIGS. 7 and 9A-9D). Consequently, it is possible to omit a process of chamfering the corner edges, thereby simplifying the manufacture of the stator 13.

In the present embodiment, the insulating sheets 26 have their respective outer resin layers 62A (or resin-expanded portions 66) provided on the outer surfaces thereof on the first axial side of the stator core 20 from which the electrical conductor segments 40 are inserted inside the insulating sheets 26. Consequently, during the twisting of the electrical conductor segments 40 on the second axial side of the stator core 20 in the electrical conductor joining step, it is possible to suppress the corner edges X of the corresponding slots 21 from biting into the substrates 61 of the insulating sheets 26 and into the electrical conductor segments 40. As a result, it is possible to suppress the insulation properties of the stator 13 from being lowered.

In the present embodiment, each of the insulating sheets 26 further includes the inner resin layer 62B that is provided, on the inner surface of the insulating sheet 26 facing the stator coil 30, in the region excluding the extension portion 65 of the insulating sheet 26. In other words, no inner resin layer 62B is provided on the inner surface of the extension portion 65. Consequently, in forming the extension portion 65 by pressing the jig 70 against the inner surface of the axial end portion of the insulating sheet 26 which constitutes the extension portion 65, it is possible to suppress the inner resin layer 62B from being foamed and cured (or expanded) by the external stimulation due to the pressing of the jig 70. As a result, it is possible to prevent the inner resin layer 62B from impeding the insertion of the electrical conductor segments 40 inside the insulating sheet 26 in the subsequent coil insertion step.

Moreover, in the modification of the present embodiment shown in FIGS. 10A-10C and 11, each of the insulating sheets 26 has the thickness-adjusted portions 63 where the thicknesses of the outer and inner resin layers 62A and 62B are set to zero (i.e., no resin layers are provided). Each of the thickness-adjusted portions 63 is provided in a predetermined region including a corresponding one of the bends B1 and B2 of the insulating sheet 26. Consequently, with the thickness-adjusted portions 63, it is possible to suppress occurrence of cracking or peeling of the resin layers 62A and 62B in the insulating sheet 26 during the manufacture of the stator 13.

More specifically, with the thickness-adjusted portions 63, it is possible to suppress occurrence of cracking or peeling of the resin layers 62A and 62B in the insulating sheet 26 during the bending of the insulating sheet 26, during the insertion of the insulating sheet 26 into the corresponding slot 21 of the stator core 20 and during the insertion of the electrical conductor segments 40 inside the insulating sheet 26. As a result, it is possible to suppress the insulation properties of the stator 13 from being lowered and reliably fix the stator coil 30 to the stator core 20 via the insulating sheets 26.

In the stator core 20, as shown in FIGS. 4 and 6, each of the slots 21 is formed to be surrounded by the back core 23, a pair of teeth 24 and a pair of collar portions 25 circumferentially extending respectively from the pair of teeth 24. Therefore, each of the slots 21 has the two first corners A1 on the radially outer side and the two second corners A2 on the radially inner side. However, in the modification of the present embodiment shown in FIGS. 10A-10C and 11, each of the insulating sheets 26 has the thickness-adjusted portions 63 provided at the bends B1 and B2 respectively corresponding to the corners A1 and A2 of the corresponding slot 21. Consequently, it is possible to suppress occurrence of cracking or peeling of the resin layers 62A and 62B in the insulating sheet 26 both on the radially outer side and the radially inner side in the corresponding slot 21.

The insulating sheets 26 and the electrical conductor segments 40 are assembled to the stator core 20 so that each of the insulating sheets 26 is wound around the electrical conductor segments 40 in the corresponding slot 21 of the stator core 20. Moreover, as shown in FIG. 11, the end portions of the insulating sheet 26 in the winding direction overlap each other. At the bends B1 (or B2) on both sides of the overlapping end portions of the insulating sheet 26 in the winding direction, cracking or peeling of the resin layers 62A and 62B may occur. In this regard, with the thickness-adjusted portions 63 provided in the predetermined regions including the bends B1 and B2, it is possible to reliably suppress occurrence of cracking or peeling of the resin layers 62A and 62B at the bends B1 and B2.

In addition, with the thickness-adjusted portions 63 provided in the predetermined regions including the bends B1 and B2 on the inner surface of the insulating sheet 26, it is also possible to reliably suppress the inner resin layer 62B from unintentionally making contact with the jig 70.

While the above particular embodiment and one modification thereof have been shown and described, it will be understood by those skilled in the art that various further modifications, changes, and improvements may be made without departing from the spirit of the present invention.

Figure 12A:
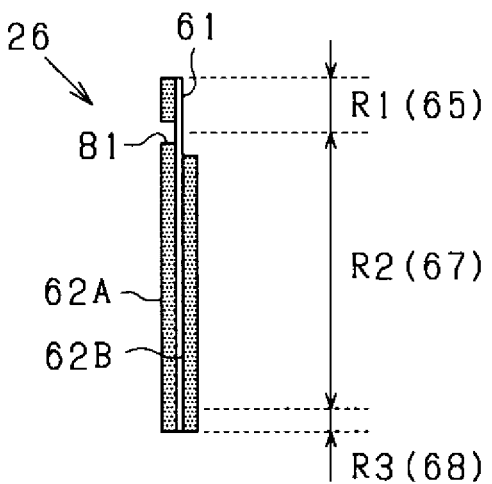
FIG. 12A is a cross-sectional view, along a thickness direction, of one of insulating sheets according to another modification before being bent.
Figure 12B:
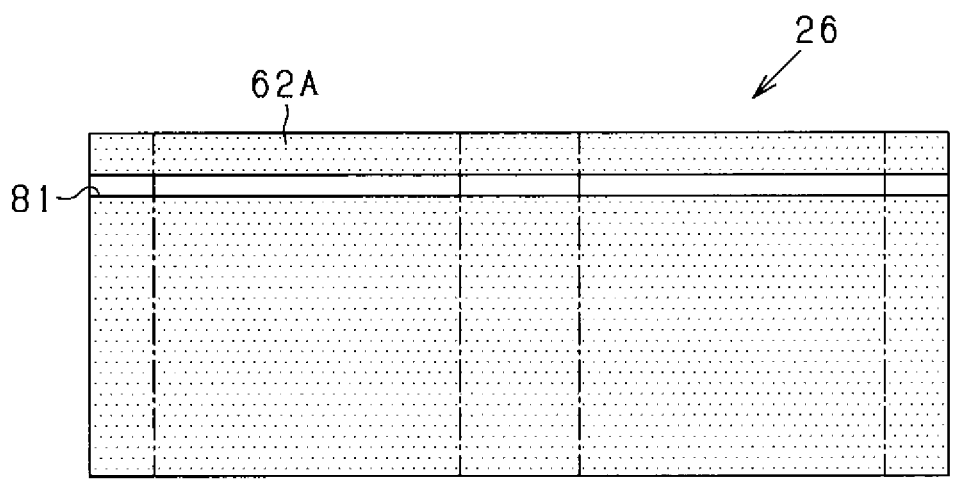
FIG. 12B is a plan view of an outer surface of the insulating sheet shown in FIG. 12A before being bent.
Figure 12C:
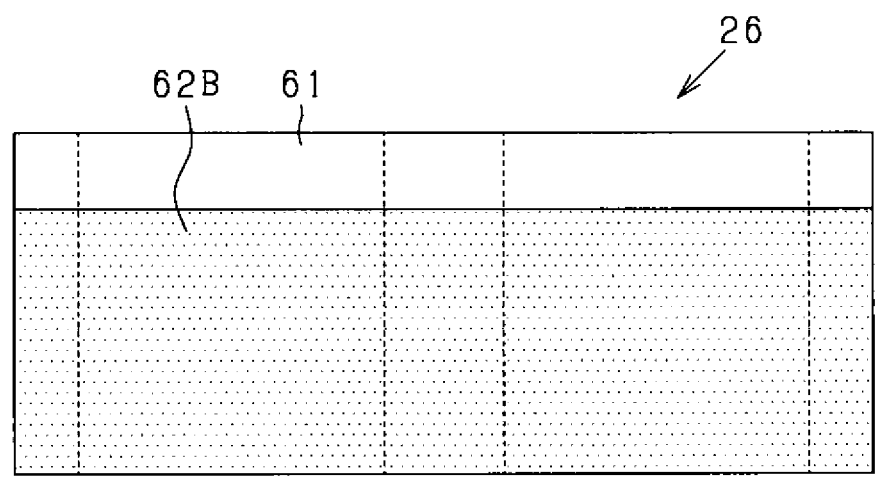
FIG. 12C is a plan view of an inner surface of the insulating sheet shown in FIGS. 12A-12B before being bent.

(1) For example, FIGS. 12A-12C show one of insulating sheets 26 according to another modification before being bent and assembled to the stator core 20. Specifically, FIG. 12A is a cross-sectional view of the insulating sheet 26 along its thickness direction. FIG. 12B is a plan view of an outer surface of the insulating sheet 26 (or that surface of the insulating sheet 26 which faces, after the insulating sheet 26 is bent and assembled to the stator core 20, the interior wall surface of the stator core 20 defining the corresponding slot 21). FIG. 12C is a plan view of an inner surface of the insulating sheet 26 (or that surface of the insulating sheet 26 which faces, after the insulating sheet 26 is bent and assembled to the stator core 20, the electrical conductor segments 40 inserted in the corresponding slot 21).

As shown in FIGS. 12A and 12B, in this modification, each of the insulating sheets 26 has a thickness-adjusted portion 81 which is provided at a boundary between the extension portion 65 and the in-slot portion 67 on the outer surface of the insulating sheet 26 and where the thickness of the outer resin layer 62A is set to zero or to be smaller than in the extension portion 65 and the in-slot portion 67.

In manufacturing the stator 13, in the sheet insertion step, each of the insulating sheets 26 is inserted into the corresponding slot 21 of the stator core 20 so that the thickness-adjusted portion 81 of the insulating sheet 26 is located axially outside the first axial end face 20b of the stator core 20. Then, in the extension portion forming step, for each of the insulating sheets 26, that axial end portion of the insulating sheet 26 which protrudes from the first axial end face 20b of the stator core 20 and includes the thickness-adjusted portion 81 is pressed by the jig 70 to form the extension portion 65 of the insulating sheet 26.

During the pressing of the axial end portion (or the extension portion 65) of the insulating sheet 26 toward the first axial end face 20b of the stator core 20, though there is no or only a small amount of the curable and foamable resin in the thickness-adjusted portion 81, the resin-expanded portion 66 (see FIG. 7) is still formed between the extension portion 65 of the insulating sheet 26 and the first axial end face 20b of the stator core 20 by those portions of the outer resin layer 62A which are adjacent to the thickness-adjusted portion 81.

Figure 13A:
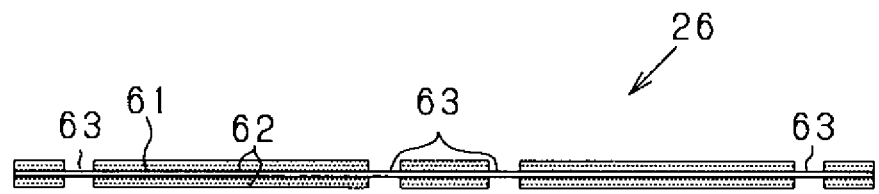
FIG. 13A is a cross-sectional view, along a thickness direction, of one of insulating sheets according to yet another modification before being bent.
Figure 13B:
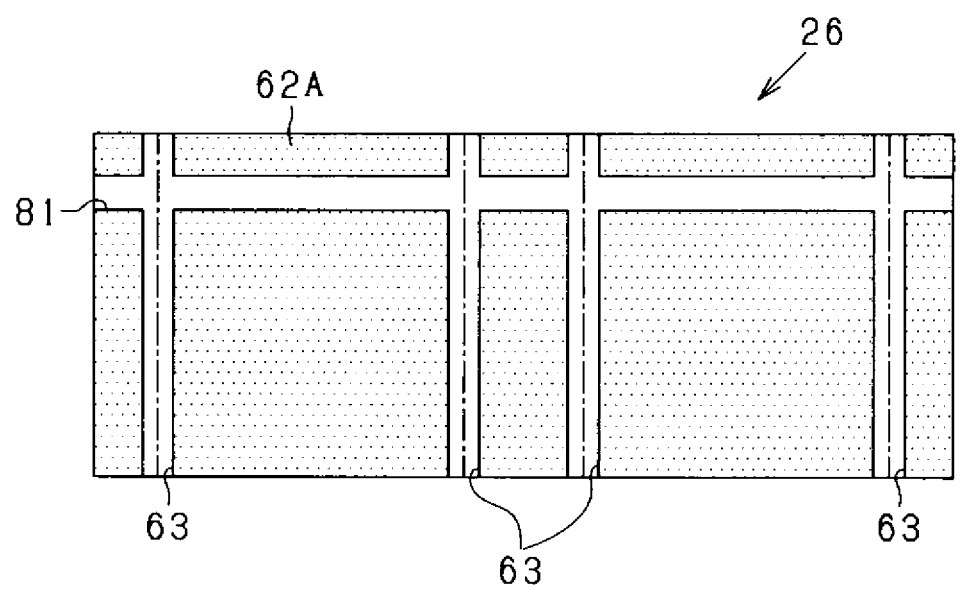
FIG. 13B is a plan view of an outer surface of the insulating sheet shown in FIG. 13A before being bent.
Figure 13C:
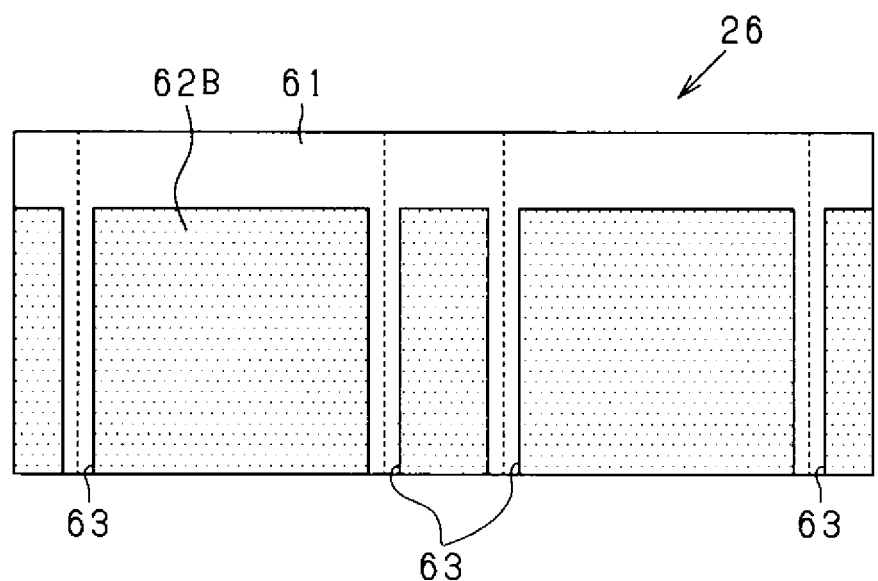
FIG. 13C is a plan view of an inner surface of the insulating sheet shown in FIGS. 13A-13B before being bent.
Figure 14:
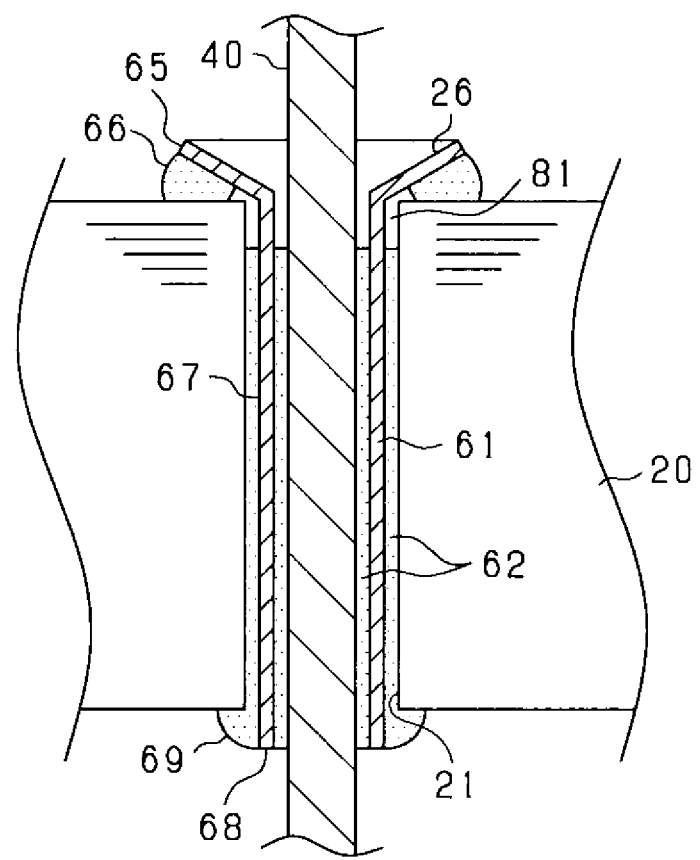
FIG. 14 is a cross-sectional view of part of the stator core, the insulating sheet shown in FIGS. 13A-13C which is bent and inserted in one of the slots of the stator core, and part of one of the electrical conductor segments which is inserted inside the insulating sheet.

(2) FIGS. 13A-13C show one of insulating sheets 26 according to yet another modification before being bent and assembled to the stator core 20. Specifically, FIG. 13A is a cross-sectional view of the insulating sheet 26 along its thickness direction. FIG. 13B is a plan view of an outer surface of the insulating sheet 26 (or that surface of the insulating sheet 26 which faces, after the insulating sheet 26 is bent and assembled to the stator core 20, the interior wall surface of the stator core 20 defining the corresponding slot 21). FIG. 13C is a plan view of an inner surface of the insulating sheet 26 (or that surface of the insulating sheet 26 which faces, after the insulating sheet 26 is bent and assembled to the stator core 20, the electrical conductor segments 40 inserted in the corresponding slot 21). FIG. 14 is a cross-sectional view illustrating the insulating sheet 26 after being bent and assembled to the stator core 20 together with the electrical conductor segments 40.

As shown in FIGS. 13A and 13B, in this modification, each of the insulating sheets 26 has thickness-adjusted portions 63 which are provided respectively in first regions and where the thicknesses of the outer and inner resin layers 62A and 62B are set to zero or to be smaller than in other portions of the insulating sheet 26. Each of the first regions extends along a corresponding one of the bends B1 and B2 (see FIG. 6) of the insulating sheet 26. Moreover, each of the insulating sheets 26 also has a thickness-adjusted portion 81 which is provided in a second region and where the thicknesses of the outer and inner resin layers 62A and 62B are set to zero or to be smaller than in other portions of the insulating sheet 26. The second region intersects the first regions and adjoins the extension portion 65 of the insulating sheet 26. In addition, the widths of the first and second regions are set so that the thickness-adjusted portions 63 and 81 remain as air gaps in the corresponding slot 21 of the stator core 20 after the outer and inner resin layers 62A and 62B are foamed and cured.

In operation, with the axially-extending air gaps formed respectively of the thickness-adjusted portions 63, the electrical conductor segments 40 forming the stator coil 30 can be cooled over the entire axial length of the stator core 20. At the same time, with the ring-like air gap formed of the thickness-adjusted portion 81 to surround the electrical conductor segments 40 inserted inside the insulating sheet 26, the electrical conductor segments 40 can be cooled over the entire circumference of a cross section of the corresponding slot 21 taken perpendicular to the axial direction of the stator core 20. More specifically, as shown in FIG. 14, the ring-like air gap is located at the first axial end (i.e., the upper end in FIG. 14) of the stator core 20 adjacent to the extension portion 65 of the insulating sheet 26.

(3) In the above-described embodiment, each of the insulating sheets 26 has the resin layers 62A and 62B provided respectively on the outer and inner surfaces thereof.

However, each of the insulating sheets 26 may be modified to have only the resin layer 62A provided on the outer surface thereof. In other words, each of the insulating sheets 26 may be modified to have no resin layer 62B provided on the inner surface thereof. In this case, after the insertion of the insulating sheet 26 into the corresponding slot 21 of the stator core 20 and the insertion of the electrical conductor segments 40 inside the insulating sheet 26, the resin layer

62A provided on the outer surface of the insulating sheet 26 is foamed and cured by external stimulation applied to the stator core 20.

(4) In the above-described embodiment, the electrical conductor segments 40 forming the stator coil 30 have a substantially rectangular cross-sectional shape.

Alternatively, the electrical conductor segments 40 may have, for example, a substantially circular cross-sectional shape.

(5) In the above-described embodiment, the present invention is directed to the stator 13 of the rotating electric machine 10 that is configured as an automotive alternator. However, the present invention can also be applied to stators of other rotating electric machines, such as a stator of an electric motor, a stator of an electric generator and a stator of a motor-generator that can selectively function both as an electric motor and as an electric generator.

What is claimed is:

1. A stator for a rotating electric machine, the stator comprising:
   an annular stator core having a plurality of slots arranged in a circumferential direction thereof;
   a stator coil provided on the stator core so as to be received in the slots of the stator core; and
   a plurality of insulating sheets each of which is interposed, in a corresponding one of the slots of the stator core, between the stator coil and an interior wall surface of the stator core defining the corresponding slot,
   wherein
   each of the insulating sheets includes a sheet-like substrate and a resin layer provided on an outer surface of the substrate facing the interior wall surface of the stator core defining the corresponding slot, the resin layer being formed of a curable and foamable resin that is foamed and cured by heating, the curable and foamable resin being composed of a thermosetting resin and a foaming agent,
   each of the insulating sheets has an extension portion located outside the corresponding slot of the stator core, the extension portion extending nonparallel to an axial direction of the stator core so as to face an axial end face of the stator core,
   in each of the insulating sheets, the resin layer is provided, on the outer surface of the substrate, in a region including the extension portion, and
   each of the insulating sheets has a resin-expanded portion that is formed, by causing the resin layer to expand in the region including the extension portion, to fill a space between the extension portion and the axial end face of the stator core and thereby maintain the relative position of the extension portion to the axial end face of the stator core.

2. The stator as set forth in claim 1, wherein the axial end face of the stator core which the extension portion of each of the insulating sheets faces is a first axial end face,
   in each of the insulating sheets, the extension portion is provided at a first axial end of the insulating sheet and a protruding portion is provided at a second axial end of the insulating sheet which is on an opposite axial side to the first axial end,
   the protruding portion protrudes outside the corresponding slot of the stator core from a second axial end face of the stator core which is on an opposite axial side to the first axial end face of the stator core, and
   the region, in which the resin layer is provided on the outer surface of the substrate of the insulating sheet, also includes the protruding portion.

3. The stator as set forth in claim 1, wherein the stator coil is formed of a plurality of electrical conductor segments each of which is substantially U-shaped to have a pair of straight portions and a turn portion connecting the straight portions,
   the straight portions are inserted respectively in corresponding two of the slots of the stator core from a first axial side of the stator core to have end parts thereof protruding respectively from the corresponding two slots to a second axial side of the stator core which is opposite to the first axial side,
   the protruding end parts of the straight portions are twisted respectively toward opposite sides in the circumferential direction of the stator core,
   each corresponding pair of the protruding end parts of the straight portions of the electrical conductor segments are connected to each other, and
   the extension portions of the insulating sheets are provided on the first axial side of the stator core.

4. The stator as set forth in claim 1, wherein in each of the insulating sheets, the resin layer provided on the outer surface of the substrate is an outer resin layer, and
   each of the insulating sheets further includes an inner resin layer that is provided, on an inner surface of the substrate facing the stator coil, in a region excluding at least the extension portion of the insulating sheet, the inner resin layer being also formed of a curable and foamable resin that is foamed and cured by external stimulation.

5. The stator as set forth in claim 1, wherein in each of the insulating sheets, the substrate has a bend formed to conform to a corner on the interior wall surface of the stator core defining the corresponding slot, and
   each of the insulating sheets has first and second thickness-adjusted portions provided respectively in first and second regions on the outer surface of the substrate, the first region extending along the bend of the substrate, the second region intersecting the first region and adjoining the extension portion of the insulating sheet, and
   in the first and second thickness-adjusted portions, a thickness of the resin layer is set to zero or to be smaller than in other portions on the outer surface of the substrate.

6. A method of manufacturing a stator for a rotating electric machine,
   the stator comprising:
   an annular stator core having a plurality of slots arranged in a circumferential direction thereof;
   a stator coil provided on the stator core so as to be received in the slots of the stator core; and
   a plurality of insulating sheets each of which is interposed, in a corresponding one of the slots of the stator core, between the stator coil and an interior wall surface of the stator core defining the corresponding slot,
   wherein
   each of the insulating sheets includes a sheet-like substrate and a resin layer that is provided, on an outer surface of the substrate facing the interior wall surface of the stator core defining the corresponding slot, in a region including an axial end portion of the insulating sheet, the resin layer being formed of a curable and foamable resin that is foamed and cured by heating, the curable and foamable resin being composed of a thermosetting resin and a foaming agent, and in each of the insulating sheets, the substrate has a width in an axial direction of the stator core larger than an axial length of the stator core, the method comprising:
- a sheet insertion step for inserting each of the insulating sheets, along the interior wall surface of the stator core defining the corresponding slot, into the corresponding slot so that the axial end portion of the insulating sheet is located axially outside an axial end face of the stator core;
- an extension portion forming step for forming, for each of the insulating sheets, an extension portion of the insulating sheet by pressing the axial end portion of the insulating sheet toward the axial end face of the stator core using a jig, the extension portion extending nonparallel to the axial direction of the stator core so as to face the axial end face of the stator core; and
- a coil insertion step for inserting, from an axial side of the stator core where the extension portion of each of the insulating sheets is formed, the stator coil inside the insulating sheets in the corresponding slots of the stator core, wherein
in the extension portion forming step, the jib is heated to cause the resin layer to expand in the region including the extension portion, thereby forming a resin-expanded portion that fills a space between the extension portion and the axial end face of the stator core so as to maintain the relative position of the extension portion to the axial end face of the stator core.

7. The method as set forth in claim 6, wherein in each of the insulating sheets, the region, in which the resin layer is provided on the outer surface of the substrate, includes an in-slot portion of the insulating sheet which is received in the corresponding slot of the stator core as well as the axial end portion of the insulating sheet which constitutes the extension portion, and the method further comprises, after the coil insertion step, a resin curing step for applying the external stimulation to the stator core and thereby causing, for each of the insulating sheets, the resin layer provided in the in-slot portion of the insulating sheet to be foamed and cured.

8. The method as set forth in claim 7, wherein in each of the insulating sheets, the resin layer provided on the outer surface of the substrate is an outer resin layer,
- each of the insulating sheets further includes an inner resin layer that is provided, on an inner surface of the substrate facing the stator coil, in a region including the in-slot portion of the insulating sheet, the inner resin layer being also formed of a curable and foamable resin that is foamed and cured by external stimulation, and
- in the resin curing step, the external stimulation is applied to both the stator core and the stator coil at the same time, causing the outer and inner resin layers provided in the in-slot portions of the insulating sheets to be foamed and cured at the same time.

9. The method as set forth in claim 6, wherein in each of the insulating sheets, the resin layer provided on the outer surface of the substrate is an outer resin layer,
- each of the insulating sheets further includes an inner resin layer that is provided, on an inner surface of the substrate facing the stator coil, in a region excluding at least the axial end portion of the insulating sheet which constitutes the extension portion, and
- in the extension portion forming step, for each of the insulating sheets, the extension portion of the insulating sheet is formed with the jig set in contact with only part of the inner surface of the insulating sheet where no inner resin layer is provided.

10. The method as set forth in claim 9, wherein in the sheet insertion step, for each of the insulating sheets, the substrate of the insulating sheet is bent to have a bend conforming to a corner on the interior wall surface of the stator core defining the corresponding slot,
- each of the insulating sheets has a thickness-adjusted portion provided in a region extending along the bend of the substrate, and
- in the thickness-adjusted portion, thicknesses of the outer and inner resin layers are set to zero or to be smaller than in other portions on the outer and inner surfaces of the substrate of the insulating sheet.

* * * * *